(12) United States Patent
Odachi et al.

(10) Patent No.: US 7,092,819 B2
(45) Date of Patent: Aug. 15, 2006

(54) ROUTE GUIDANCE INFORMATION GENERATING DEVICE AND METHOD, AND NAVIGATION SYSTEM

(75) Inventors: Eriko Odachi, Yokohama (JP); Shugo Horikami, Tokyo (JP); Yuki Kawamura, Yokohama (JP); Takumi Ajima, Kanazawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 119 days.

(21) Appl. No.: 10/958,576

(22) Filed: Oct. 6, 2004

(65) Prior Publication Data

US 2005/0049786 A1    Mar. 3, 2005

Related U.S. Application Data

(62) Division of application No. 10/089,697, filed on Jul. 17, 2002, now abandoned.

(51) Int. Cl.
*G06F 17/30* (2006.01)
*G01C 21/34* (2006.01)

(52) U.S. Cl. .................. 701/211; 701/200; 707/100

(58) Field of Classification Search ............ 701/200, 701/208, 210, 209, 202; 707/4, 100, 102, 707/10, 104.1, 200; 340/995.19, 990; 709/217, 709/202, 203, 218, 219
See application file for complete search history.

(56) References Cited

U.S. PATENT DOCUMENTS

| | | | |
|---|---|---|---|
| 4,954,959 A | 9/1990 | Moroto et al. | |
| 5,874,905 A | 2/1999 | Nanba et al. | |
| 6,035,253 A | 3/2000 | Hayashi et al. | |
| 6,084,543 A | 7/2000 | Iizuka | |
| 6,226,590 B1 | 5/2001 | Fukaya et al. | |
| 6,249,740 B1 | 6/2001 | Ito et al. | |
| 6,266,613 B1 * | 7/2001 | Nimura et al. ............ | 701/210 |
| 6,304,820 B1 | 10/2001 | Goto et al. | |
| 6,317,781 B1 * | 11/2001 | De Boor et al. ............ | 709/217 |
| 6,321,158 B1 | 11/2001 | DeLorme et al. | |
| 6,477,526 B1 | 11/2002 | Hayashi et al. | |
| 6,615,131 B1 * | 9/2003 | Rennard et al. ............ | 701/200 |

FOREIGN PATENT DOCUMENTS

| | | |
|---|---|---|
| EP | 810571 | 12/1997 |
| EP | 840509 | 5/1998 |
| EP | 1003017 | 5/2000 |
| JP | 1-132911 | 5/1989 |
| JP | 3-63518 | 3/1991 |
| JP | 8-285632 | 1/1996 |
| JP | 8-54249 | 2/1996 |
| JP | 8-94375 | 4/1996 |
| JP | 8-110237 | 4/1996 |

(Continued)

*Primary Examiner*—Dalena Tran
(74) *Attorney, Agent, or Firm*—Louis Woo

(57) ABSTRACT

Route guidance information capable of displaying a route can be generated in an easy-to-understand, user-friendly manner even on a small screen of a navigation system. To generate such information, route guidance information at plural guide points on the route between plural points is so constructed that each piece of route guidance information will fit in the area of one screen. Display positions of the route guidance information are brought into one-to-one correspondence with numeric keys in ascending numeric order, and into correspondence with one another through hyperlinks not accompanied by calling of another file. Each file is divided so that each piece will not exceed the file size or maximum value of the numeric keys.

15 Claims, 37 Drawing Sheets

FOREIGN PATENT DOCUMENTS

| | | |
|---|---|---|
| JP | 8-278155 | 10/1996 |
| JP | 9-292834 | 11/1997 |
| JP | 9-305108 | 11/1997 |
| JP | 9-319991 | 12/1997 |
| JP | 10-39981 | 2/1998 |
| JP | 10-143403 | 5/1998 |
| JP | 10-200572 | 5/1998 |
| JP | 10-198267 | 7/1998 |
| JP | 10-281789 | 10/1998 |
| JP | 11-259031 | 9/1999 |
| JP | 11-296074 | 10/1999 |
| JP | 2000-18955 | 1/2000 |
| JP | 2000-28371 | 1/2000 |
| JP | 2000-28390 | 1/2000 |
| JP | 2000-32166 | 1/2000 |
| JP | 2000-46567 | 2/2000 |
| JP | 2000-113388 | 4/2000 |
| JP | 2000-123295 | 4/2000 |
| JP | 2000-146603 | 5/2000 |
| JP | 2000-151811 | 5/2000 |
| JP | 2000-215211 | 5/2000 |
| JP | 2000-155035 | 6/2000 |
| JP | 2000-155896 | 6/2000 |

* cited by examiner

FIG.13

| NUMERIC KEY NUMBER 1301 | NUMERIC AND EXTERNAL CHARACTER 1302 | EXTERNAL CHARACTER IMAGE 1303 |
|---|---|---|
| 1 | #&63879; | [1] |
| 2 | #&63880; | [2] |
| 3 | #&63881; | [3] |
| 4 | #&63882; | [4] |
| 5 | #&63883; | [5] |
| 6 | #&63884; | [6] |
| 7 | #&63885; | [7] |
| 8 | #&63886; | [8] |
| 9 | #&63887; | [9] |
| 0 | #&63888; | [0] |

```
<HTML><HEAD><TITLE>21</TITLE></HEAD><BODY>
<HR><A name="n1">1-驪</A><A href="#n1" accesskey="1">Maeharasakaue</A><BR>
<DIV ALIGN=CENTER><IMG SRC="4sd.gif"ALT=" straight ahead"ALIGN=LEFT WIDTH=48 HEIGHT=48 HSPACE=4>
from here<BR>straight ahead<BR>1.5km<BR CLEAR=ALL></DIV><BR><BR>
<HR><A name="n2">1-麗</A><A href="#n2" accesskey="2">Maehara-hasyutujomae</A><BR>,
<DIV ALIGN=CENTER><IMG SRC="4sd.gif"ALT="straight ahead"ALIGN=LEFT WIDTH=48 HEIGHT=48 HSPACE=4>
from here<BR>straight ahead<BR>200m<BR CLEAR=ALL></DIV><BR><BR>
<HR><A name="n3">1-黎</A><A href="#n3" accesskey="3">intersection</A><BR>
<DIV ALIGN=CENTER><IMG SRC="4ld.gif"ALT=" turn left"ALIGN=LEFT WIDTH=48 HEIGHT=48 HSPACE=4>
after left turn<BR>2km<BR>straight ahead<BR CLEAR=ALL></DIV><BR><BR>
<HR><A name="n4">1-力</A><A href="#n4" accesskey="4">Wakaba-cho 2</A><BR>
<DIV ALIGN=CENTER><IMG SRC="4ld.gif"ALT="turn left"ALIGN=LEFT WIDTH=48 HEIGHT=48 HSPACE=4>
after left turn<BR>5km<BR>straight ahead<BR CLEAR=ALL></DIV><BR><BR>
<HR><A name="n5">1-曆</A><A href="#n5" accesskey="5">Shimohuda</A><BR>
<DIV ALIGN=CENTER><IMG SRC="4rd.gif"ALT="turn right"ALIGN=LEFT WIDTH=48 HEIGHT=48 HSPACE=4>
after right turn<BR>270m<BR>straight ahead<BR CLEAR=ALL></DIV><BR><BR>
<HR>殮<A href="22.htm#n1" accesskey="0">next</A><BR></BODY><HTML>
```

1402

```
<HTML><HEAD><TITLE>22</TITLE></HEAD><BODY>
連<A href="21.htm#n5">forward</A>
<HR><A name="n1">2-驪</A><A href="#n1" accesskey="1">Futakotamagawa</A><BR>
<DIV ALIGN=CENTER><IMG SRC="4rd.gif"ALT="turn right"ALIGN=LEFT WIDTH=48 HEIGHT=48 HSPACE=4>
after right turn<BR>2km<BR>straight ahead<BR CLEAR=ALL></DIV><BR><BR>
<HR><A name="n2">2-麗</A><A href="#n2" accesskey="2">Mizonokuchi stn. south exit</A><BR>
<DIV ALIGN=CENTER><IMG SRC="3ld.gif"ALT="turn left"ALIGN=LEFT WIDTH=48 HEIGHT=48 HSPACE=4>
after left turn<BR>2km<BR>straight ahead<BR CLEAR=ALL></DIV><BR><BR>
<HR><A name="n3">2-黎</A><A href="#n3" accesskey="3">Nokyo-mae</A><BR>
<DIV ALIGN=CENTER><IMG SRC="4ld.gif"ALT="turn left"ALIGN=LEFT WIDTH=48 HEIGHT=48 HSPACE=4>
after right turn<BR>1.3km<BR>straight ahead<BR CLEAR=ALL></DIV><BR><BR>
<HR><A name="n4">2-力</A><A href="#n4" accesskey="4">Shibogushi</A><BR>
<DIV ALIGN=CENTER><IMG SRC="4rd.gif"ALT="turn right"ALIGN=LEFT WIDTH=48 HEIGHT=48 HSPACE=4>
after right turn<BR>3.5km<BR>straight ahead<BR CLEAR=ALL></DIV><BR><BR>
<HR><A name="n5">2-曆</A><A href="#n5" accesskey="5">Yoshida-guchi</A><BR>
<DIV ALIGN=CENTER><IMG SRC="4ld.gif"ALT="turn left"ALIGN=LEFT WIDTH=48 HEIGHT=48 HSPACE=4>
after left turn<BR>500km<BR>straight ahead<BR>goll<BR CLEAR=ALL></DIV><BR><BR>
<HR>戀<A href="11.htm#n1" accesskey="0">to guidance</A><BR></BODY><HTML>
```

FIG.16
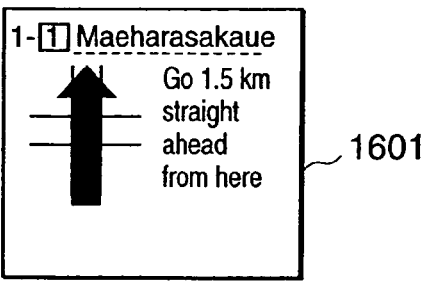
1601
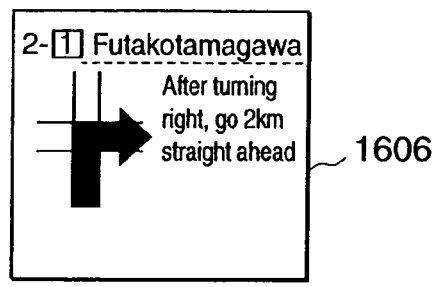
1606
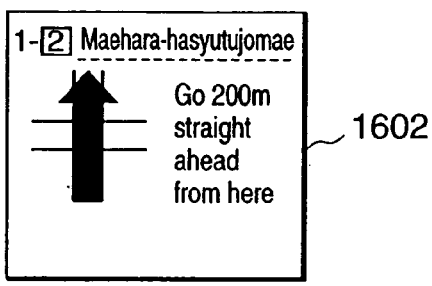
1602
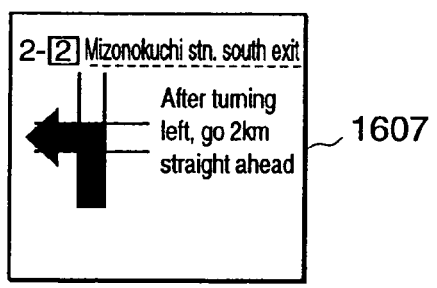
1607
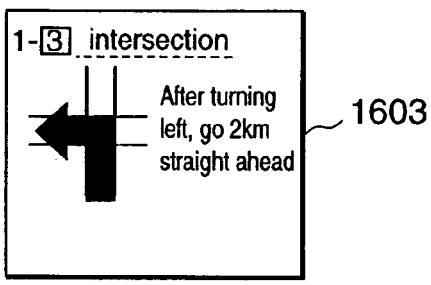
1603
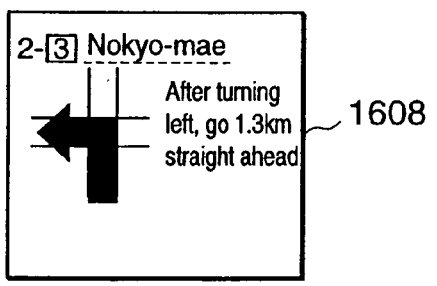
1608
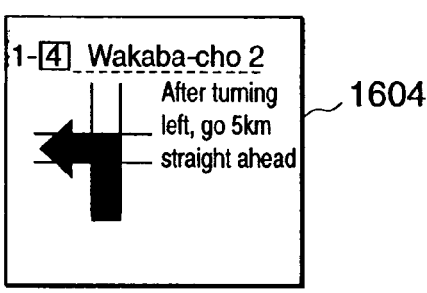
1604
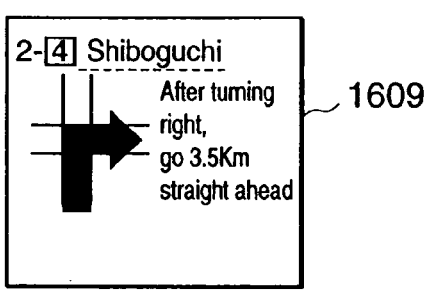
1609
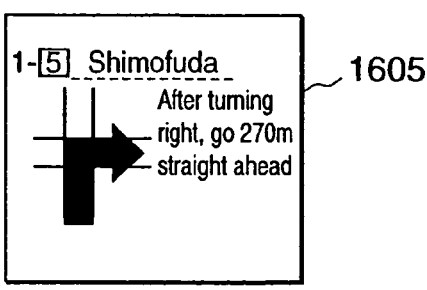
1605
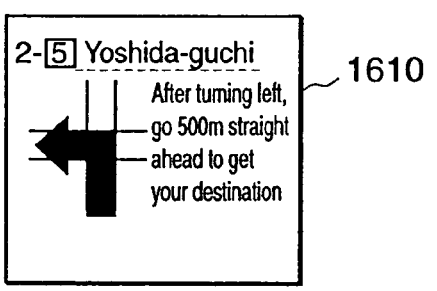
1610

FIG.27
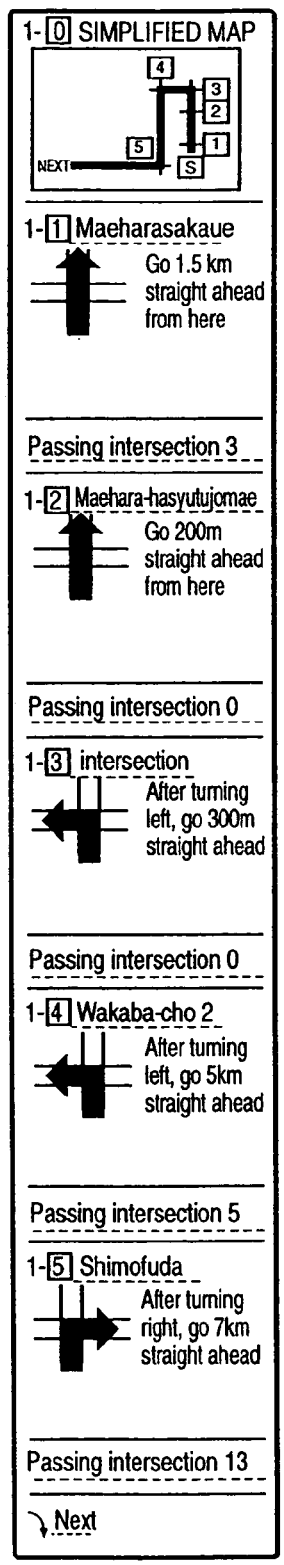
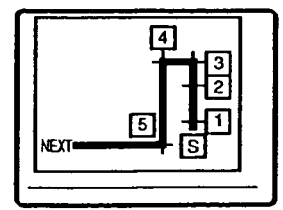
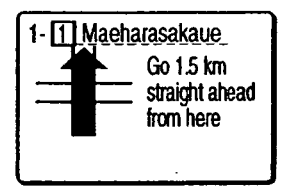
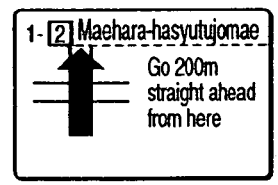
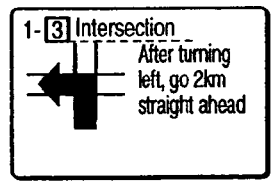
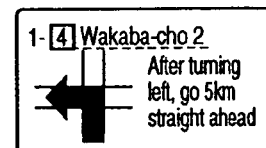
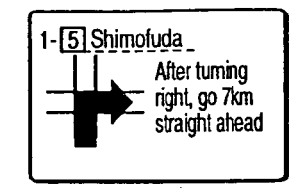

FIG.30
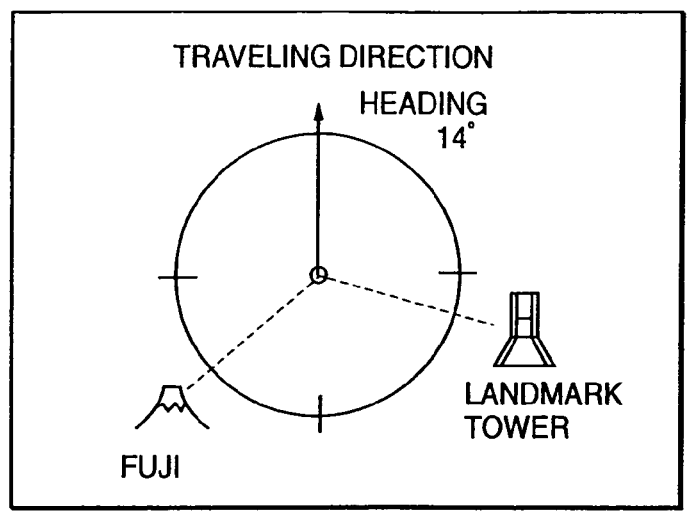
FIG.31
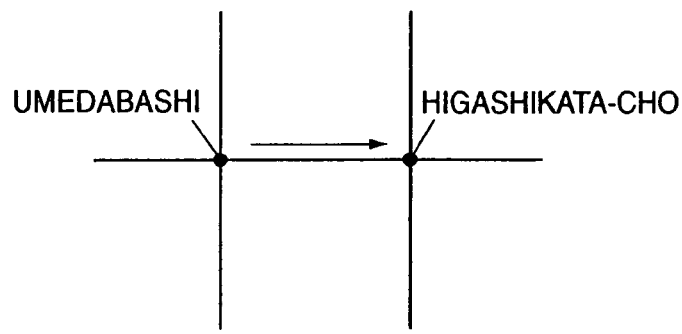
FIG.32
FIRST INTERSECTION
UMEDABASHI
NEXT INTERSECTION
HIGASHIKATA-CHO
STARTING PLACE SETTING

ROUTE DIAGRAM

FIG.38 http://nav.◯◯◯.com/cgi/nav.dll?search?

ox=135.1234?oy=35.1234?dx=135.4321?dy=35.4321

_____/ _____/

LATITUDE AND LONGITUDE OF STARTING PLACE     LATITUDE AND LONGITUDE OF DESTINATION

?mode=0?ver=1.0

_____/_____/

SEARCH MODE     MAP VERSION

3001 MISCOURSE TRAP

ROUTE GUIDANCE INFORMATION GENERATING DEVICE AND METHOD, AND NAVIGATION SYSTEM

This application is a divisional of prior application Ser. No. 10/089,697 filed Jul. 17, 2002 now abandoned.

TECHNICAL FIELD

The present invention relates to an information generating device, a device for generating route guidance information, a center device for sending out the generated route guidance information to various terminals such as a mobile terminal, a mobile communication terminal and a navigation device equipped with communication means, a route guidance information generating method, a storage medium on which the generated route guidance information is stored, and a communication-type navigation system for showing the route information searched at the center to navigate a communication terminal.

BACKGROUND ART

Conventionally, car navigation devices equipped with map storage means, input means, search means and present position calculation means have been known. The devices are to show guide information such as the course or traveling direction of the next intersection at just the right time in relation to a present position.

Navigation methods for transmitting a route result searched at a center have also known in the conventional, for example, as proposed and disclosed in Japanese unexamined patent publication Nos. 2000-46567, Hei 11-296074, 2000-113388, 2000-123295 and 2000-155896, which can reduce the amount of data to be transmitted from the center to a terminal, and communication time and costs.

With route guidance information generating devices and methods, a method and device for automatically forming a deformation map as disclosed in Japanese unexamined patent publication No. Hei 10-198267, and a navigation device and method as disclosed in Japanese unexamined patent publication No. 2000-155035 are known. A technique for representing an overview of a guide route as a deformation map or patterned text stored on a provided medium is also known.

In the above-mentioned prior art, however, a hardware configuration of a terminal is such that a display screen is small, and underperforming CPU and memory can only perform simple control processing, or response time during which a user has to wait until route guidance information desired by the user is displayed and the point as to whether expression is possible on the small display screen are not considered, which results in problems that the conventional technology makes the response time long and operability bad, and can not display or determine the route on such a terminal only with a small display screen. Further, since the above-mentioned conventional communication-type navigation system is premised on use of a relatively big display screen and a navigation-only terminal with relatively large memory capacity, it also has such a problem that the system becomes expensive.

DISCLOSURE OF THE INVENTION

The present invention has been made to solve the above-mentioned problems, and it is an object thereof to provide an outstanding route guidance information generating device and an outstanding route guidance method capable of making the response time short and discriminating the contents of a display even on a terminal having such a hardware configuration that the display screen is small and the CPU and memory can only perform simple processing.

It is another object of the present invention to provide a communication-type navigation system capable of showing an initial geographical orientation and a route even on a communication terminal whose display screen and memory capacity are small.

In solving the above-mentioned problems and according to the present invention, there is provided an information generating device comprising at least display means and character or symbol input means, which is used in an information generating system for generating a receive unit file for transmission or communication to represent information created using a hyperlink, wherein display positions of plural pieces of information in the same file are brought into one-to-one correspondence with numeric keys, and into correspondence with one another through hyperlinks, and the correspondences do not accompany calling of another file. In this configuration, information can be displayed and confirmed one by one each time a numeric key is pressed without the need for communication time to call another file in each case.

Another information generating device according to the present invention comprises at least display means and character or symbol input means, which is used in an information generating system for generating a receive unit file for transmission or communication to represent information created using a hyperlink, wherein information is created for bringing display positions of plural pieces of ordered information into one-to-one correspondence with numeric keys in ascending numeric order. In this configuration, plural pieces of information to be continuously represented can be confirmed one by one by pressing the numeric keys in ascending numeric order.

In the information generating device according to the present invention, pieces of the receive unit file in the same file are brought into correspondence with one another through hyperlinks not accompanied by calling of another file. In this configuration, plural pieces of information to be continuously represented can be displayed and confirmed one by one by pressing the numeric keys in ascending numeric order without the need for communication time to call another file in each case.

Still another information generating device comprises at least display means and character or symbol input means, which is used in an information generating system for generating a receive unit file for transmission or communication to represent information created using a hyperlink, wherein plural pieces of ordered information are divided into files according to the file size or number of numeric keys, the divided plural files are brought into one another through hyperlinks, and display positions of the plural pieces of information with sequence numbers in each file are brought into one-to-one correspondence with the numeric keys in ascending numeric order through hyperlinks. In this configuration, a file can be divided into pieces each of which fits in the reception capacity of the terminal and transmitted in the form of divided pieces, and even if the terminal has an unlimited reception capacity, transmission can be completed in a fixed period of time. Further, effective use of the numeric keys composed of ten keys from 0 to 9 is made possible.

Yet another information generating device comprises at least display means and character or symbol input means, which is used in an information generating system for generating a receive unit file for transmission or communication to represent information created using a hyperlink, wherein display positions of plural pieces of information in the same file, each piece being capable of fitting in one-screen display space of the display means, are brought into one-to-one correspondence with numeric keys, and into correspondence with one another through hyperlinks not accompanied by calling of another file. In this configuration, each information is distilled to one screen, so that the information can be displayed and confirmed one by one by pressing the numeric keys without the need to scroll the cursor.

Yet another information generating device comprises at least display means and character or symbol input means, which is used in an information generating system for generating a receive unit file for transmission or communication to represent information created using a hyperlink, wherein display positions of plural pieces of ordered information in the same file are brought into one-to-one correspondence with numeric keys through hyperlinks not accompanied by calling of another file, each piece of ordered information being capable of fitting in one-screen display space of the display means. In this configuration, since each information is distilled to one screen, it is easy-to-understand without the need to scroll the cursor. Further, plural pieces of information to be continuously represented can be displayed and confirmed one by one by pressing the numeric keys in ascending numeric order without the need for communication time to call another file in each case.

In another aspect of the present invention, there is provided a route guidance information generating device comprising: display means; map storage means storing a road network; input means for entering plural points; search means for taking in from the input means information obtained from the map storage means to calculate a route between plural points; route guidance element generating means for generating route guidance elements for route guidance on the basis of the route result calculated by the search means; and route guidance information generating means for generating route guidance information on the basis of the route guidance elements generated by the route guidance element generating means, wherein the route guidance information generating means generates route guidance information at plural guide points on the route between plural points as plural pieces of ordered information or information capable of fitting in one-screen display space of the display means. In this configuration, since each information is distilled to one screen, it is easy-to-understand without the need to scroll the cursor. Further, route guidance information at plural guide points to be continuously represented can be displayed and confirmed one by one by pressing the numeric keys in ascending numeric order without the need for communication time to call another file in each case.

In the route guidance information generating device according to the present invention, the route guidance information contains at least distance on each road to the next guide point. In this configuration, the contents of the route guidance information can easily be grasped according to the distance on the road at the time of confirming the route before starting or during traveling on the site.

In the route guidance information generating device according to the present invention, the route guidance information contains at least intersection names. In this configuration, the intersection names are contained, so that the contents of the route guidance information can easily be grasped at the time of confirming the route before starting or during traveling on the site.

In the route guidance information generating device according to the present invention, the plural guide points include named intersections located at the nearest side of corresponding nameless intersections along the traveling direction as well as locations at which geographical orientations change to a considerable extent before and after intersections, Y branches and locations at which road types change. In this configuration, even if an intersection is nameless, a named intersection located at the nearest side of the nameless intersection can be used as the guide point, which makes it easy to grasp the contents of the route guidance information during traveling on the site.

In the route guidance information generating device according to the present invention, the route guidance information contains at least display information images, which represent with arrows traveling directions at intersections of roads. In this configuration, since the traveling direction at each guide point is represented with an arrow, the contents of the route guidance information can easily be grasped at the time of confirming the route before starting or during traveling on the site.

In the route guidance information generating device according to the present invention, the route guidance information contains at least display information images, which represent with arrows directions indicative of crossing conditions at intersections of roads and traveling directions at the intersections of roads. In this configuration, since directions indicative of crossing conditions at intersections of roads and traveling directions at the intersections of roads are represented with an arrow, the contents of the route guidance information can easily be grasped at the time of confirming the route before starting or during traveling on the site.

In the route guidance information generating device according to the present invention, the route guidance information contains at least display information images, which represent with arrows directions indicative of crossing conditions at intersections of roads, widths of the roads and traveling directions at the intersections of the roads. In this configuration, since the directions indicative of crossing conditions, the widths of the roads and the traveling directions are represented with the arrows, the contents of the route guidance information can easily be grasped at the time of confirming the route before starting or during traveling on the site.

In the route guidance information generating device according to the present invention, the route guidance information contains at least display information images which represent with arrows traveling directions at intersections of roads, and distance on each road to the next guide point, the distance being located at the tip of each arrow of the display information images that represent with the arrows the traveling directions. In this configuration, since the distance to the next guide point is displayed, the contents of the route guidance information can easily be grasped at a glance.

In the route guidance information generating device according to the present invention, the route guidance information contains at least display information images which represent break lines between the guide points. In this configuration, since the break lines divide and display information between the guide points, the contents of the route guidance information can easily be grasped at a glance.

In the route guidance information generating device according to the present invention, the route guidance information contains at least any of character, image or voice information, or a combination of these pieces of information. In this configuration, the contents of the route guidance information can easily be grasped.

In the route guidance information generating device according to the present invention, display positions of intersection names at the guide points in the route guidance information, composed of a plurality of names of intersections to pass through on the route between plural points, are brought into one-to-one correspondence with numeric key in ascending numeric order through hyperlinks. In this configuration, the intersection names between the guide points allow the user to confirm whether there is an error during traveling on the site. Further, the route guidance information at the plural guide points to be continuously represented can be displayed and confirmed one by one by pressing the numeric keys in ascending numeric order.

In the route guidance information generating device according to the present invention, a route guidance simplified map represented by images, the map schematically synthesizing driving directions of the intersections at the plural guide points in one file, brought into one-to-one correspondence with the numeric keys, corresponding numerals are put in positions corresponding to the guide points on the route guidance simplified map, and the display positions are brought into one-to-one correspondence with the numeric keys in ascending numeric order, and into correspondence with one another thorough hyperlinks. In this configuration, an overview of the guide route can easily be grasped. Further it can be displayed and confirmed one by one by pressing the numeric keys in ascending numeric order, which makes it possible to instantaneously grasp how many guide points there are in one file.

In the route guidance information generating device according to the present invention, the positions at which corresponding numerals are represented on the route guidance simplified map are standardized on either the right or left side of the traveling directions. In this configuration, the correspondences between the guide points on the route guidance simplified map and the numeric keys are regularized, which makes it easy to grasp the positions of the guide points on the route guidance simplified map.

In the route guidance information generating device according to the present invention, information is created for representing the route guidance information in plural levels of hierarchy and associating the plural levels of the guidance information with one another through a hyperlink on a guide point basis. In this configuration, the user is enabled to move between the plural levels of the guide points, which makes it easy to grasp the route guidance information.

In the route guidance information generating device according to the present invention, the route guidance information represented in the plural levels of hierarchy is divided into files dependently on the division of the next-higher level of hierarchy. In this configuration, the user can easily grasp the correspondences between the display positions and the numeric keys.

In still another aspect of the present invention, there is provided a route guidance information providing center device comprising the map storage means, the search means, the route guidance element generating means, the route guidance information generating means, reception means for receiving input from the route guidance information generating means and input from the outside, and transmission means for transmission to the outside, wherein the input from the outside is received and the route guidance information generated is sent out to the outside. This configuration makes it possible to provide the generated information in a quick response time to such a terminal with underperforming, unsophisticated hardware.

In the route guidance information providing center device according to the present invention, map information is called from the map storage means to send out map information corresponding to the route guidance information together with the route guidance information. This configuration makes it possible to provide to the receive terminal the information that enables the receive terminal to realize more sophisticated function from the map information received.

In yet another aspect of the present invention, there is provided a navigation device including at least the input means and present position calculating means for calculating a present position, the navigation device comprising communication means for receiving the route guidance information and the map information sent out from the route guidance providing center device, wherein a display screen is displayed or voice guidance is performed through a hyperlink according to the present position information. This configuration makes it possible to show the user the route according to the present position or perform detection and automatic re-search processing when the user deviates from the route.

Another navigation device, which include at least the input means, present position calculating means for calculating a present position and the route guidance information generating means, comprises communication means for receiving the route guidance elements and the map information sent out from the route guidance providing center device, wherein a display screen is displayed or voice guidance is performed through a hyperlink according to the present position information. In this configuration, since the generation of the route guidance elements that requires high-performance, sophisticated hardware is performed outside, even a terminal with underperforming, unsophisticated hardware can generate route guidance information from the route guidance elements received to use it for route guidance.

Still another navigation device includes at least the map storage means, the input means, the search means, the route guidance element generating means, the route guidance information generating means, and the present position calculating means for calculating the present position of its own device, wherein a display screen is displayed or voice guidance is performed through a hyperlink according the present position information on the basis of the route guidance information generated. This configuration enables the user to perform such sophisticated guidance as to show the next guidance according the present position and confirm the route guidance information at the guide route points before starting in a user-friendly manner.

In yet another aspect of the present invention, there is provided an information generating method comprising: a route searching step of setting a starting place and a destination, inputting through input means information obtained from map storage means, and calculating a route between plural points; a step of generating route guidance elements for route guidance on the basis of the route result calculated in the route searching step; a step of generating route guidance information at plural guide points on the route between the plural points on the basis of the route guidance elements generated; and a step of displaying through display means the route guidance information generated, wherein display positions of plural pieces of route guidance information in the same file are brought into one-to-one correspondence with numeric keys so that the route guidance information will be serially displayed, and into correspondence with one another through hyperlinks not accompanied by calling of another file. This configuration enables the user to confirm the route guidance information in a user-friendly manner.

In yet another aspect of the present invention, there is provided a storage medium for storing the route guidance information generated by any of the above-mentioned devices. This configuration makes it possible to use user-friendly route guidance information on various terminals.

In a system according to the present invention, the center divides the route guidance information into plural pieces each of which has a size equal to or less than the reception capacity of the communication terminal to transmit the divided information. In this configuration, even a mobile communication terminal with low memory capacity can successively obtain the following section of a route to show a long-distance route.

In the system according to the present invention, the route guidance information is represented according to a communication protocol or in an application language suitable for use in a network. In this configuration, any existing network terminal can be used as a communication terminal in a communication-type navigation system without making any adaptation.

In the system according to the present invention, the route information is represented in compact hypertext markup language (hereinafter called compact HTML). In this configuration, any compact-HTML-ready mobile communication terminal can be used as a communication terminal in the communication-type navigation system without making any adaptation.

In the system according to the present invention, the route information is represented in hypertext markup language (hereinafter called HTML). In this configuration, any HTML-ready mobile communication terminal can be used as a communication terminal in the communication-type navigation system without making any adaptation.

In the system according to the present invention, the route information is represented according to a wireless application protocol (hereinafter called WAP). In this configuration, any WAP-ready mobile communication terminal can be used as a communication terminal in the communication-type navigation system without making any adaptation.

In the system according to the present invention, an initial geographical orientation of the communication terminal is displayed, which makes it possible to show the user the initial geographical orientation.

In the system according to the present invention, the initial geographical orientation is displayed in relation to the position of a celestial body, which makes it possible to display the initial geographical orientation in relation to the position of the celestial body.

In the system according to the present invention, the initial geographical orientation is displayed in relation to the position of a surrounding landmark or landmarks, which makes it possible to display the initial geographical orientation in relation to the position of the surrounding landmarks.

In the system according to the present invention, main points of the route are inputted, which makes possible more detailed route guidance.

In the system according to the present invention, the starting place is set by inputting the first intersection and the next intersection. In this configuration, the user informs the center of his or her traveling direction so that the center can show a route along the direction.

In the system according to the present invention, plural guidance elements located close to a real destination are listed so that one element will be selected and inputted therefrom. In this configuration, the user determines a guidance element so that the destination can be set accurately.

In the system according to the present invention, input is done by voice, which enables the user to enter the starting place and destination in a user-friendly manner.

In the system according to the present invention, input is done on an external keyboard connected to the communication terminal, which enables the user to enter the starting place and destination in a user-friendly manner.

In the system according to the present invention, a turn cost at nameless intersections is weighted, which makes possible route search with few frequencies of turns at nameless intersections.

In the system according to the present invention, function select buttons are provided, which enables the user to select functions.

In the system according to the present invention, labels are attached to guide points on a route overview. In this configuration, the user can press a button indicated by a corresponding one of the labels to shift the current screen to a guidance detailed screen.

In the system according to the present invention, a re-search button is provided at some midpoint on the route guidance, which makes it possible to start re-search at some midpoint on the route as a starting point.

In the system according to the present invention, a long-distance route is divided and searched, and a button to search for a continued part is provided at the end of each divided piece, which makes possible search for the following section of the route.

In the system according to the present invention, a button to determine whether priority is assigned to understandability of the route or reduction of hours of the travel. In this configuration, the search cost parameters can be changed according to the selected user model to adjust the route to the user model.

In the system according to the present invention, a guidance program which describes the route guidance information is downloadable to the communication terminal. In this configuration, the terminal can perform route guidance via the downloaded program without the need to receive information from the center in each case.

In the system according to the present invention, an execution result of the guidance program downloaded is divided and displayed in a display area on the communication terminal, which provides easy-to-see, easy-to-understand display contents.

In the system according to the present invention, changes on the route are displayed on the communication terminal, which makes it possible to inform the user of the changes on the route.

In the system according to the present invention, when a change in distance to a turn direction arrow display or intersection or to the destination occurs, the distance is displayed, which makes it possible to inform the user of the change on the route.

In the system according to the present invention, when the user approaches a guide point, the volume or tone color of a beep is changed, which makes it possible to inform the user of the change on the route.

In the system according to the present invention, when the user approaches a guide point, the communication terminal turns its backlight on, which makes it possible to inform the user of the change on the route.

In the system according to the present invention, when an event has occurred, the center informs the communication terminal of the event, which makes it possible to inform the user of the change on the route.

In the system according to the present invention, when the user deviates from the suggested route, re-search is activated, which enables the user to start re-searching for a route to the original route or destination when deviating from the suggested route.

In the system according to the present invention, when the user deviates from the suggested route, information on surrounding roads to pass through is transmitted to the communication terminal together with the suggested route, which makes off-course judgment more accurate.

In the system according to the present invention, routes including return routes to the original route are pre-calculated and sent to the communication terminal beforehand, which makes it possible to show the user a return route to the original route instantaneously without any search when the user has deviated from the original route.

In the system according to the present invention, advertisements are displayed or conducted, which gives commercial importance to the communication terminal as advertising media.

In the system according to the present invention, information on facilities of commercial sponsors is made viewable on the map so that the center will extract and display or conduct the facility information in the neighborhood of the route. In this configuration, stores intended to run advertisements on the route searched can be displayed.

In the system according to the present invention, the commercial sponsors are charged. In this case, advertisement fees can be obtained after a sponsor contract.

In the system according to the present invention, each of the commercial sponsors is charged according to the number of times the advertisement concerned is displayed or conducted. In this configuration, the advertisement fees can be collected according to the number of times the advertisement concerned is displayed or conducted.

BRIEF DESCRIPTION OF THE
ACCOMPANYING DRAWINGS

The above objects and features of the present invention will be more apparent from embodiments to be described in connection with the following accompanying drawings.

FIG. 13 is a diagram of a numeric key-numeric and external character correspondence table according to the embodiments of the present invention.

FIG. 14 is a diagram showing an example of route guidance information described in html according to the embodiments of the present invention.

FIG. 16 is a diagram showing an example of display images displayed on a screen basis according to the embodiments of the present invention.

FIG. 27 is a diagram for explaining the operation of the terminal according to the third embodiment of present invention.

FIG. 30 is a diagram showing another specific example of a display screen showing an initial geographical orientation according to the sixth embodiment of present invention.

FIG. 31 is a diagram showing a specific example of a display screen showing an initial geographical orientation according to the seventh embodiment of present invention.

FIG. 32 is a diagram showing a specific example of the way to determine the initial geographical orientation according to the seventh embodiment of present invention.

FIG. 38 is a diagram showing a specific example of a URL expression according to the twelfth embodiment of present invention.

BEST MODES FOR CARRYING OUT THE INVENTION

Referring to the accompanying drawings, embodiments of the present invention will be described below in detail.

FIRST EMBODIMENT

Figure 1:
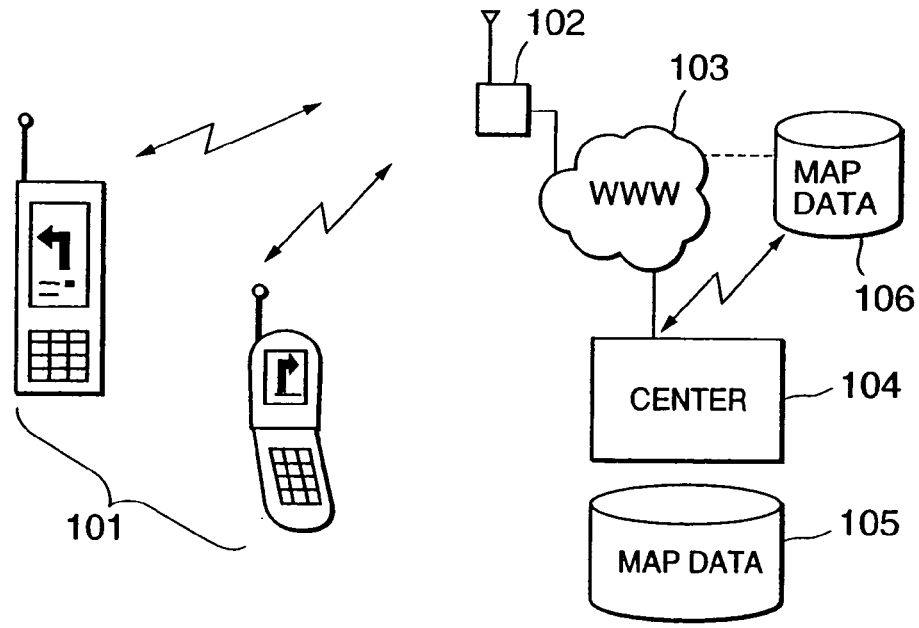
FIG. 1 is a diagram showing a configuration of a communication-type navigation system according to embodiments of the present invention, the diagram also showing a configuration of a communication-type navigation system according to the fourth embodiment of the present invention.

FIG. 1 is a diagram for explaining a system configuration of the present invention. In FIG. 1, a portable communication terminal 101 is represented as an Internet-ready portable telephone, but it is not particularly limited thereto. The portable communication terminal 101 may be any portable terminal as long as it is ready for and connectable to the Internet such as a mobile communication terminal, a navigation device with communication means or a mobile terminal. A gateway 102 constituting the main part of a base station interconnects the communication terminal 101 and an information network 103 such as the Internet. A center device 104 typified by a WWW server is connected to the information network 103 to communicate with the communication terminal 101 and provide route guidance service. A user operates the communication terminal 101 so that the service will be available. A map data 105 is a database which the center device 104 searches for a route, retrieves a search location and creates guidance data. It should be noted that the map data can be a map 106 placed in another location on the Internet.

Figure 2:
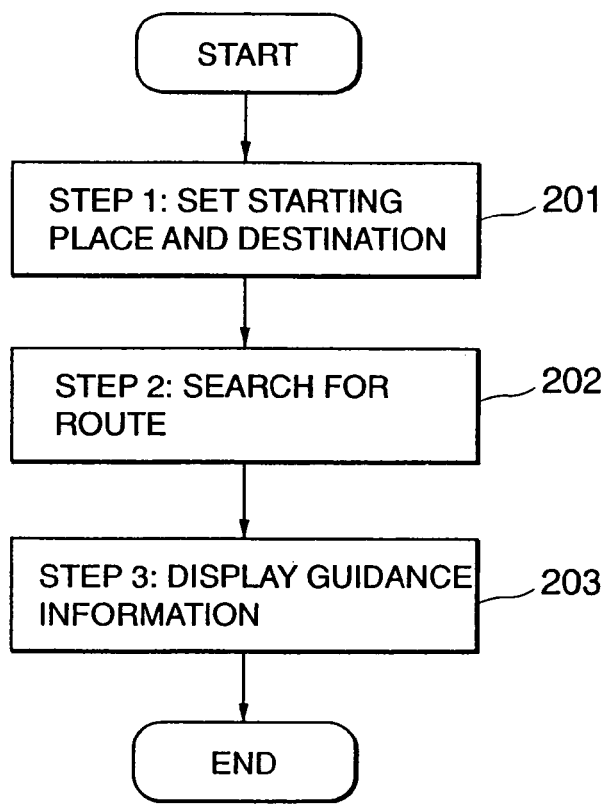
FIG. 2 is a flowchart for explaining not only the operation of the system according to the embodiments of the present invention, but also the operation of the communication-type navigation system according to the fourth embodiment of the present invention.

With the communication-type navigation system configured such above, the operation of the terminal 101 will be described with reference to FIG. 2. The user sets a starting place and a destination (step 1) as indicated at 201. This process will be described with reference to FIG. 3. The user selects a setting mode from a starting place setting screen 301 transmitted from the center device 104. Assuming that setting is started from an intersection, the user selects "1" so that an intersection name entry screen 302 will be displayed. The user enters an intersection name to set the starting place. Then, when the user sets the destination in a similar manner, the center device 104 searches for a route (step 2) as indicated at 202 to output route guidance information. Thus the guidance information is displayed on the communication terminal 101 (step 203) as indicated at 203.

Figure 4:
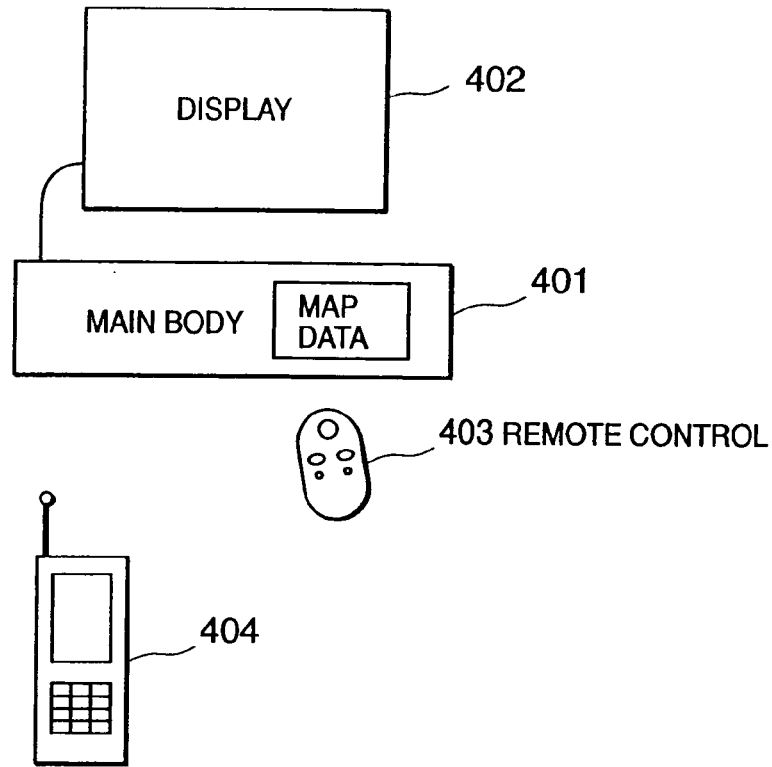
FIG. 4 is a diagram showing a configuration of a standalone navigation system according to the embodiments of the present invention, the diagram also showing a specific example of route display according to the fourth embodiment of the present invention.

FIG. 4 shows a system of the present invention in a configuration different from that of FIG. 1. In this configuration, a main body 401 realizes the features of the center device 104, and is provided with the above-mentioned map data 105. In the main body 401, there is provided a terminal 404, which is provided with a remote control 403 and a display 402 or a key input part and a display part as means for controlling input and display for realizing the input and display functions respectively, and has the same features as the communication terminal 101. This is a standalone, self-configuring type navigation system constituted of its own device alone without passing through the center device 104 as shown in FIG. 1, but it has the same effects.

Figure 17:
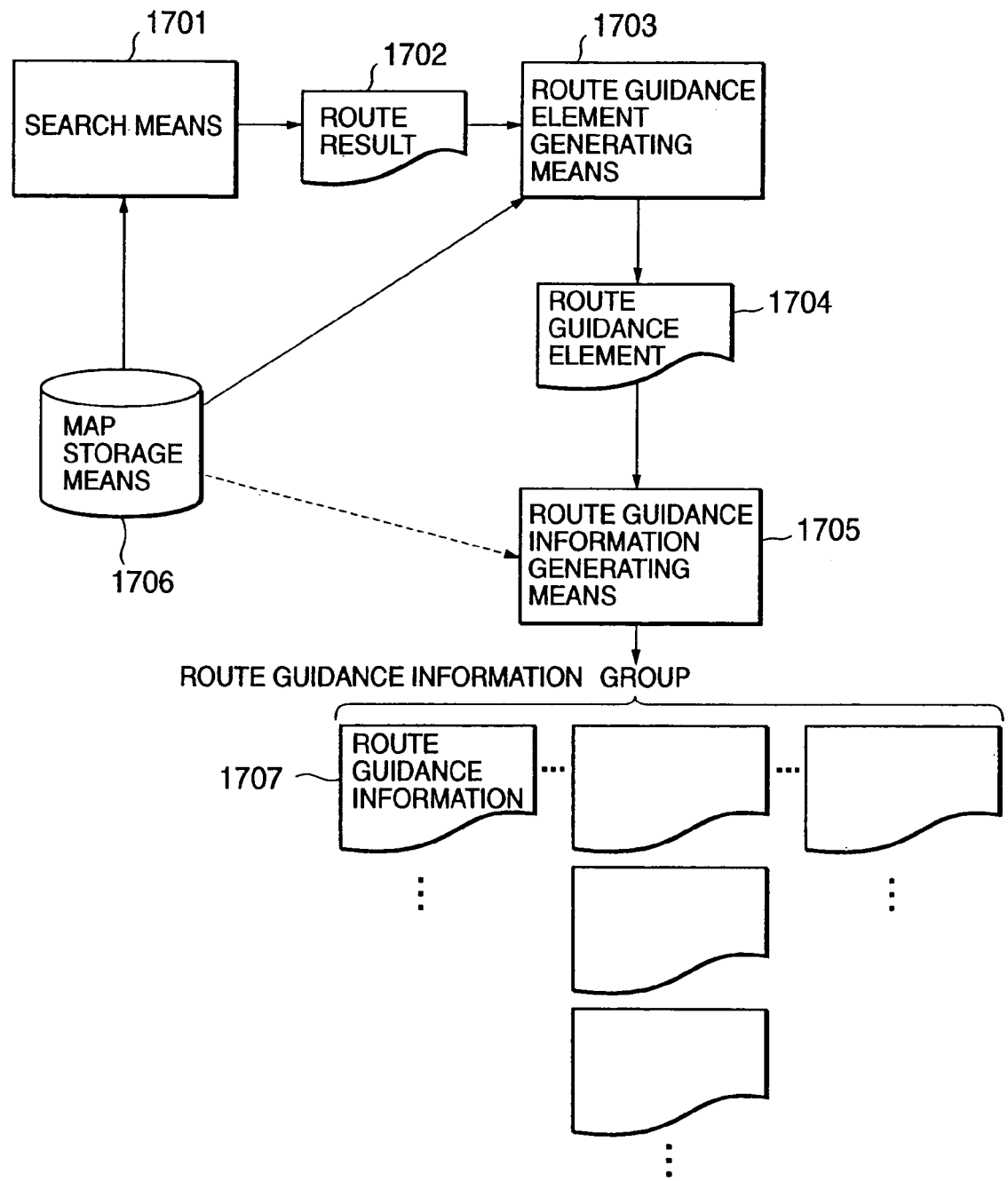
FIG. 17 is a diagram showing a configuration and operation of route guidance represented information generating means according to the first embodiment of the present invention.

FIG. 17 shows a configuration and operation of the center 104 shown in FIG. 1 or the main body 401 shown in FIG. 4 for generating route guidance information in the communication and self-configuring type navigation system configured such above.

In FIG. 17, search means 1701 refers to a map in map storage means 1706 to search for the starting place given and a route between the starting place and the destination. Here, the map storage means 1706 stores digital map data capable of being used for navigation. A route result 1702 is an output of the route determined by the search means 1701, and is recorded as a string of links through which the guidance information passes. Route guidance element generating means 1703 refers to the map in the route result 1702 and the map storage means 1706 to extract route guidance elements of intersections to be guided on the route. The passing intersections are derived from the route result 1702, and locations needing guidance such as a location in which the direction changes to a considerable extent before and after the intersection, a Y branch or a location in which the road type changes. Thus attention is given to the points to be guided to rewrite the route result. The rewritten route result is a route guidance element 1704. Then route guidance information generating means 1705 refers to the route guidance element 1704 to create route guidance information 1707 for representing guide information by using a hyperlink function.

Although the present invention will be described by using a html file for representing the guidance information, it is not limited to the html file. The file may be described in any language as long as it can use the hyperlink function.

Figure 5:
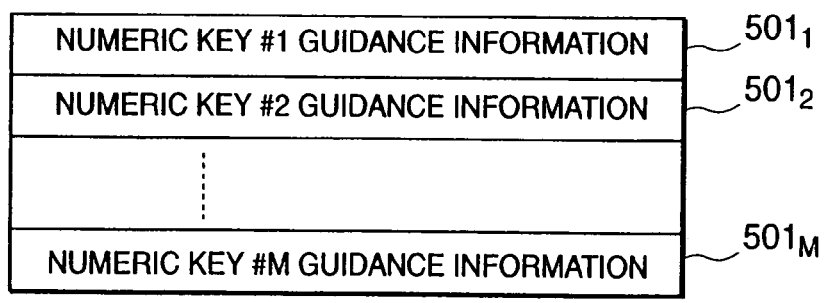
FIG. 5 is a diagram of the structure of route guidance information according to the embodiments of the present invention.

As shown in FIG. 5, the route guidance information 1707 in FIG. 17 constituted of plural pieces of guide information 501 corresponding to a plurality of numeric keys X arranged in ascending numeric order from numeric key #1 guidance information 5011 to numeric key #M guidance information 501M.

Figure 6:
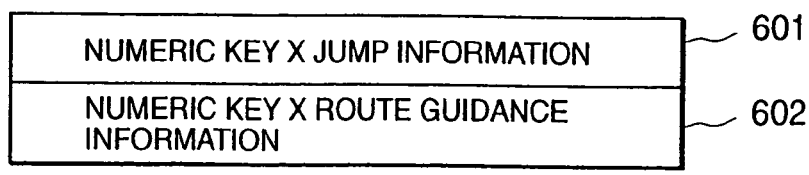
FIG. 6 is a diagram of the structure of numeric key X guidance information according to the embodiments of the present invention.

As shown in FIG. 6, the numeric key X guidance information 501 consists of the numeric key X jump information 601 and numeric key X route guidance information 602.

Figure 7:
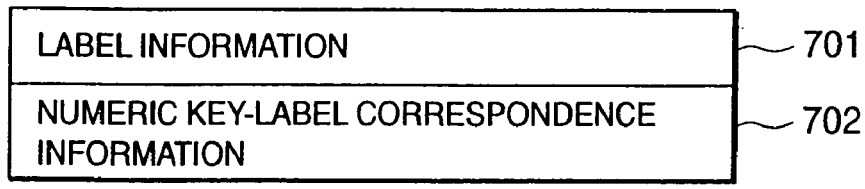
FIG. 7 is a diagram of the structure of numeric key X jump information according to the embodiments of the present invention.

As shown in FIG. 7, the numeric key X jump information 601 in FIG. 6 consists of label information 701 indicative of information related to labels and numeric key-label correspondence information 702 indicative of the correspondences between the numeric keys and the label information on jump destinations.

Figure 8:
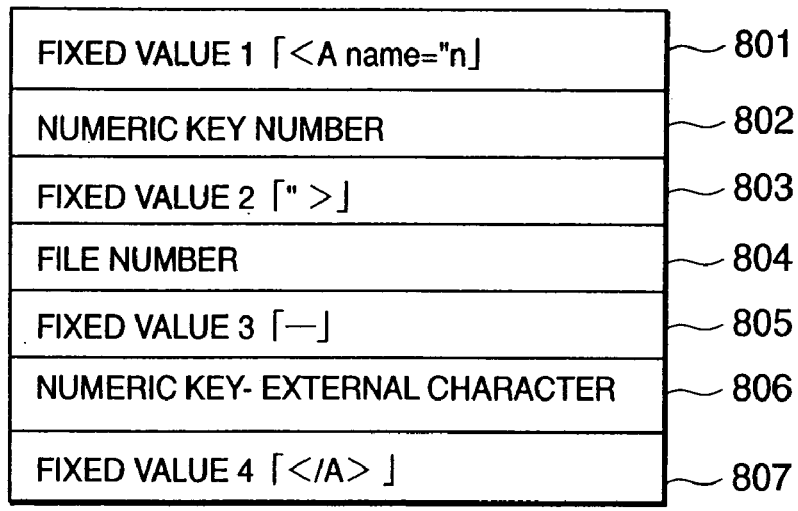
FIG. 8 is a diagram of the structure of label information according to the embodiments of the present invention.

As shown in FIG. 8, the label information 701 in FIG. 7 consists of the following: fixed values (in FIG. 8, a fixed value 1 801, a fixed value 2 803, a fixed value 3 805 and fixed value 4 807) defined as non-changing whatever the numeric key X, a numeric key number 802 corresponding to the numeric key X, a numeric key external character 806 made of an external character showing one-to-one correspondence with the numeric key X, and a file number 804 indicative of how-manieth file it is.

Specific fixed values are determined, on the basis of the terminal used and a given rule, as representing display positions switched on a screen of the terminal. For example, the fixed value 801 is '<A name="n"', the fixed value 803 is '">', the fixed value 805 is '–' and the fixed value 807 is '</A>'.

FIG. 13 is a numeric key-numeric and external character correspondence table, showing correspondences among a numeric key number 1301, a numeric and external character 1302 and an external character image 1303 in the numeric key external character 806.

Figure 9:
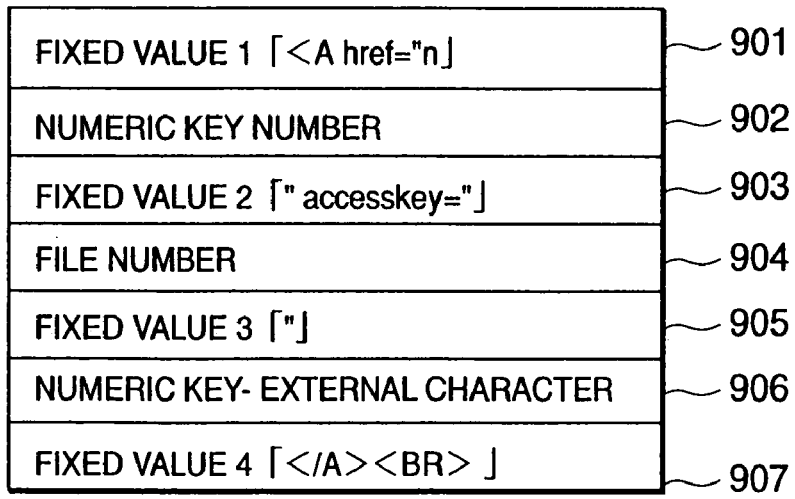
FIG. 9 is a diagram of the structure of numeric key-label correspondence information according to the embodiments of the present invention.

As shown in FIG. 9, the numeric key-label correspondence information 702 in FIG. 7 consists of fixed values (in FIG. 9, a fixed value 1 901, a fixed value 2 903, a fixed value 3 905 and a fixed value 4 907) defined as non-changing whatever the numeric key X, numeric key number 902 corresponding to the numeric key X 902, 904 and a guided intersection name 906.

Specific fixed values are determined, on the basis of the terminal used and a given rule, as representing jump destination display positions switched on the screen each time a numeric key is pressed on the terminal. For example, the fixed value 901 is '<A href="n>', the fixed value 903 is '"accesskey="', the fixed value 905 is '"' and ' " the fixed value 907 is '</A> <BR>'.

Figure 10:
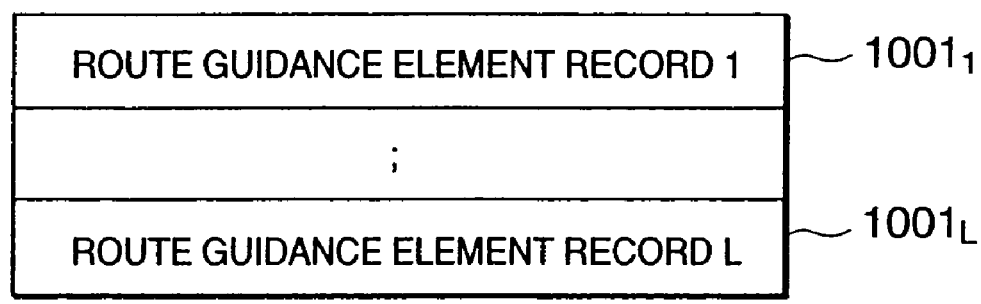
FIG. 10 is a diagram of the structure of route guidance elements according to the embodiments of the present invention.

As shown in FIG. 10, the route guidance element 1704 outputted from the route guidance element generating means 1703 in FIG. 17 are constituted of a plurality of route guidance element records 1001 arranged in order.

Figure 11:
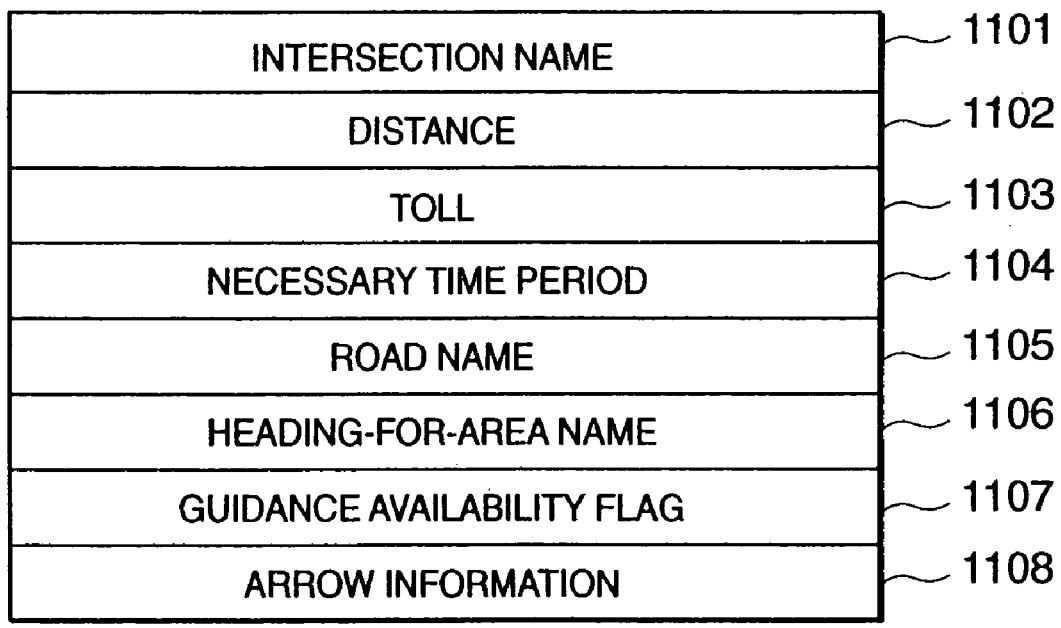
FIG. 11 is a diagram of the structure of route guidance element records according to the embodiments of the present invention.

FIG. 11 shows the structure of the route guidance element records 1001 in FIG. 10. In FIG. 11, the reference numeral 1101 designates an intersection name indicative of the name of an intersection, 1102 is a distance indicative of distance to the next route guidance element record, 1103 is a toll indicative of the toll that costs until reaching the next route guidance element record, 1104 is a necessary time period indicative of a time period to be taken until reaching the next route guidance element record, 1105 is a road name indicative of the name of a road headed for the next route guidance element record, 1106 is a heading-for-area name indicative of the name of a heading-for-area toward the next route guidance record, 1107 is a flag indicative of the presence or absence of arrow image guidance information, and 1108 is arrow information for representing the arrow image guidance information.

The arrow information may include file names, each of which indicates a patterned arrow image file, or it may be composed of information indicative of crossing conditions (directions and widths of roads) of each intersection as the background of an arrow, and information indicative of a direction of the arrow, so that the route guidance information generating means 1705 in FIG. 17 generates an arrow image or select a patterned arrow image file.

Next, the operation of the route guidance information generating means 1705 in FIG. 17 will be described with reference to FIG. 12.

At first, the route guidance information generating means 1705 initializes a file number F. Specifically, it brings the file number F to 1 (step 1201). Then the route guidance information generating means 1705 repeats a sequence of processing from step 1202 to step 1211 from the beginning to the end of the route guidance element records 1001 of the route guidance element 1704 outputted from the route guidance element generating means.

In the repeated processing, a new file to receive the output is created and header information and the like are outputted (step 1203).

Then the numeric key number X is initialized. Specifically, the number X is brought to 1 (step 1204).

It is next judged whether or not an output file to be created when the next numeric key X guidance information 501 is outputted is smaller in size than a preset value N, and the numeric key number X is 9 or less (step 1205). If it is smaller, a sequence of processing that reaches step 1209 is repeated, and if it is bigger, the processing procedure advances to step 1210 without passing through the sequence of processing that reaches step 1209. In step 1210, counting-up is performed by adding 1 to the file number Fe, and if any other route guidance element record 1001 follows the currently processed record, hyperlink information to the next file, html file completion information and the like will be outputted.

The set value N is an upper limit of one file size of representation information representable on the terminal; it is set to 5 Kbytes, for example.

Description will be made next about processing when the output file is smaller in size than the set value N.

First, in step 1206, the numeric key X jump information 601 is outputted.

The structure of the numeric key X jump information is as shown in FIGS. 8 to 9. Changed here in the contents other than the fixed values are the numeric key numbers 802, 902 and 904, the file number 804, the numeric key external character 806 and the guided intersection name 906.

Figure 12:
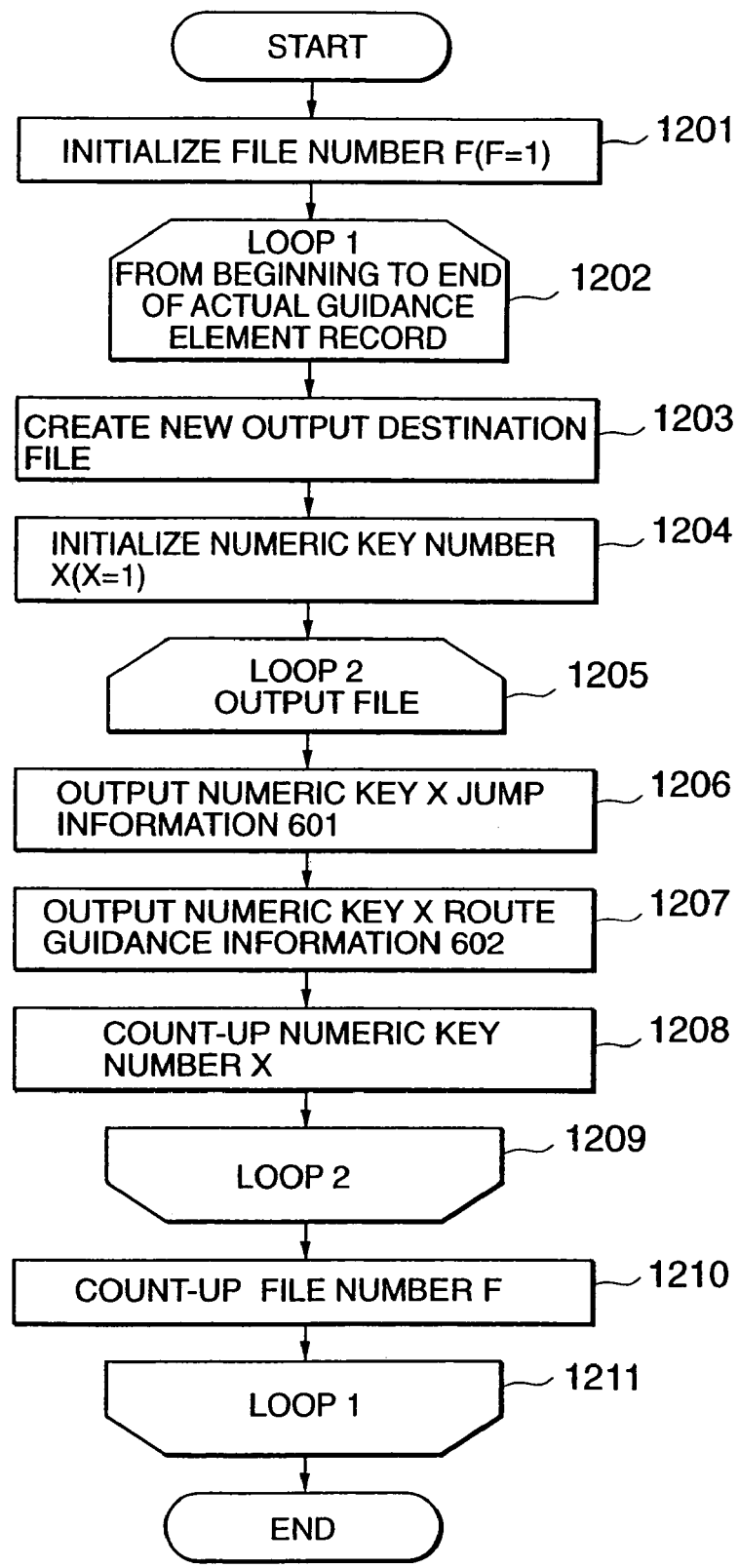
FIG. 12 is a flowchart for explaining route guidance information generating means according to the embodiments of the present invention.

Here, the guided intersection name 906 uses the intersection name 1101 in the route guidance element records 1001, the numeric key numbers 802, 902, 904 use the numeric key number X in FIG. 12, and the file number 804 uses the file number F in FIG. 12.

Further, the numeric key external character 806 uses a corresponding numeric and external character 1302 obtained by detecting the numeric key number X in FIG. 12 from the numeric key number 1301 in the numeric key-numeric and external character correspondence table.

For example, <A name="n1">1-驪 <A href="#n1" accesskey="1">Maeharasakaue</A> <BR> if the numeric key number X is 1, the file number F is 1, and the guided intersection name 906 is "Maeharasakaue," or <A name="n4">2-力 <A href="#n4" accesskey="4"> Shiboguchi</A> <BR> if the numeric key number X is 4, the file number F is 2, and the guided intersection name 906 is "shiboguchi."

Next, in step 1207, the numeric key X route guidance information 602 in FIG. 6 is created and outputted using the route guidance element records 1001. It should be noted that the numeric key X route guidance information 602 to be outputted here is designed to fit in the full-screen size of the terminal including the numeric key X jump information 601. This process may be to judge what the terminal is like, or to perform scaling of the display image to suit the display screen on the terminal side.

FIG. 14 shows an example of route guidance information 1707 thus outputted and described in html, FIG. 14 shows a series of diagrams of display images to be displayed in FIG. 14 on the terminal 101 or 404, or the display means 404, and FIG. 16 shows display images on a screen basis. It is assumed here that the display screen size of the terminal is 8 characters across×6 lines down (12 dots per character).

In FIG. 14, a file 1401 is outputted with the file number 1, while a file 1402 is outputted with the file number 2.

Figure 15:
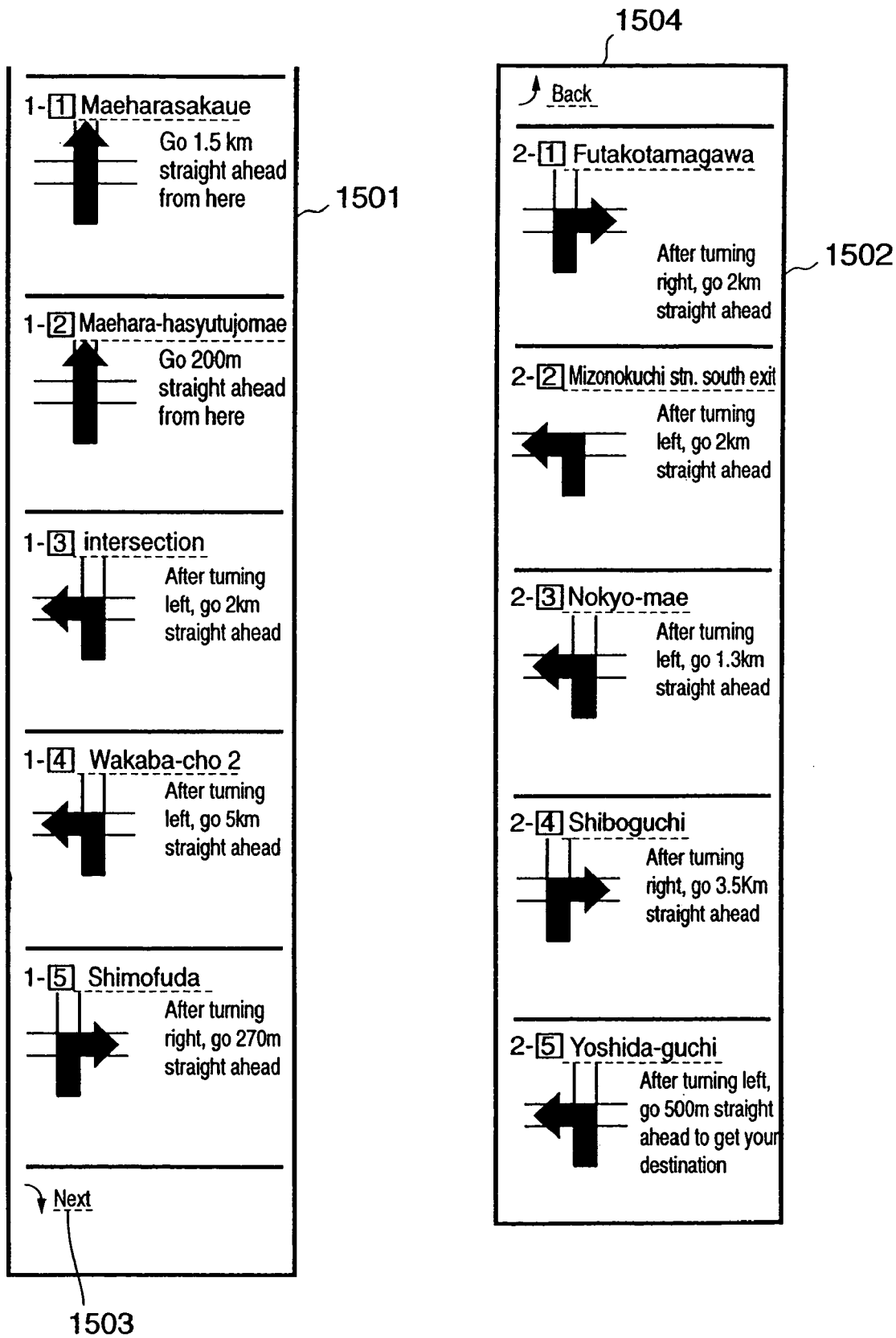
FIG. 15 is a diagram showing an example of a strip view of display images according to the embodiments of the present invention.

In FIG. 15, a display image 1501 is a strip display view of the file 1401, while a display image 1502 is a strip display view of the file 1402.

The reference numerals in FIG. 15 are as follows:
1501: A strip view of display images of the html file 1
1502: A strip view of display images of the html file 2
1503: A jump button from the html file 1 to the html file 2
1504: A jump button from the html file 2 to the html file 1

In FIG. 16, display images 1601 to 1605 divided by screen are display images per screen of the file 1401, while display images 1606 to 1610 divided by screen are display images per screen of the file 1402. The contents of each view in FIG. 16 are as follows:
1601: A one-screen display image corresponding to the numeric key 1 in the html file 1
1602: A one-screen display image corresponding to the numeric key 2 in the html file 1
1603: A one-screen display image corresponding to the numeric key 3 in the html file 1
1604: A one-screen display image corresponding to the numeric key 4 in the html file 1
1605: A one-screen display image corresponding to the numeric key 5 in the html file 1
1606: A one-screen display image corresponding to the numeric key 1 in the html file 2
1607: A one-screen display image corresponding to the numeric key 2 in the html file 2
1608: A one-screen display image corresponding to the numeric key 3 in the html file 2
1609: A one-screen display image corresponding to the numeric key 4 in the html file 2
1610: A one-screen display image corresponding to the numeric key 5 in the html file 2

When the terminal 101 or 404 receives the file 1401, a press of the numeric key 1 causes the full-screen display of the display image 1601, a press of the numeric key 2 causes the full-screen display of the display image 1502, . . . , and a press of the numeric key 5 causes the full-screen display of the display image 1605. Further, when the user moves the cursor to "Next" (display 1503) on the bottommost line in FIG. 15 and selects "Next," the file 1402 as another file is sent out from the center device 104 or the main body 401 so that the full-screen display of the display image 1606 will appear on the terminal 101 or 404, or the display means 402.

Thus, since the screens indicative of the courses of intersections as route guide points and the numeric key jump information are arranged in ascending numeric order and in proper guidance sequence, the user can press the numeric keys on the terminal in numeric order from the numeric key 1 to display the full screen of an arrow image at a guide route point one after another, which helps the user to instantaneously recognize each point on the guide route.

Figure 20:
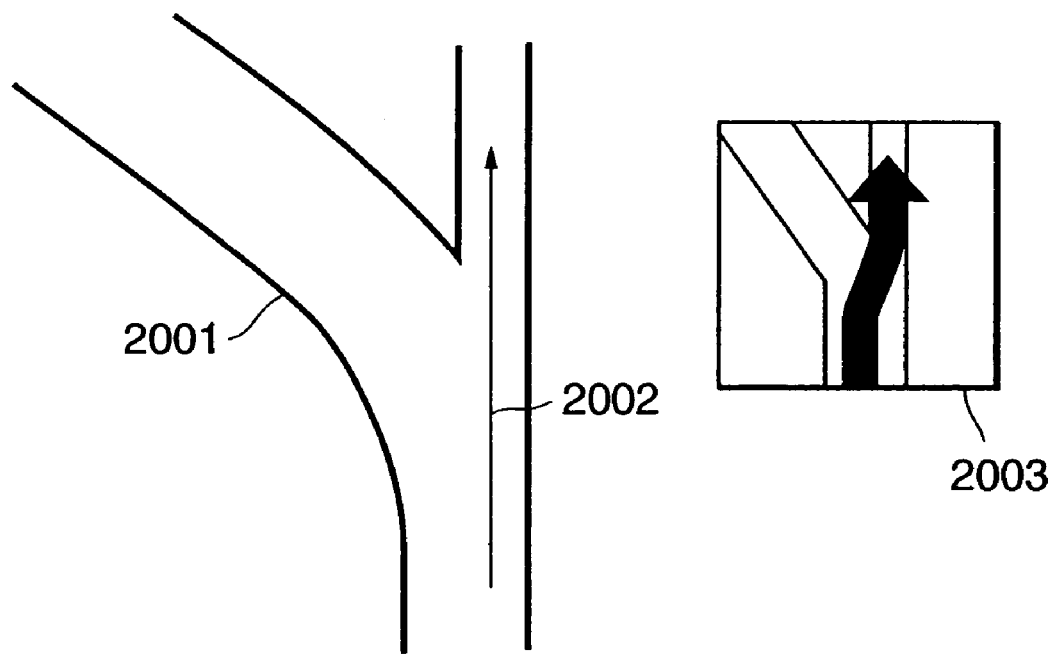
FIG. 20 is a diagram showing an example of an arrow image according to the embodiments of present invention.

As shown in FIG. 20, if an actual road is a road 2001 in shape and the traveling direction to be guided is a direction 2002, the arrow image may be represented as a display example 2003 to indicate the difference in width between the roads. This makes it possible to guide the user with fewer errors.

SECOND EMBODIMENT

Figure 18:
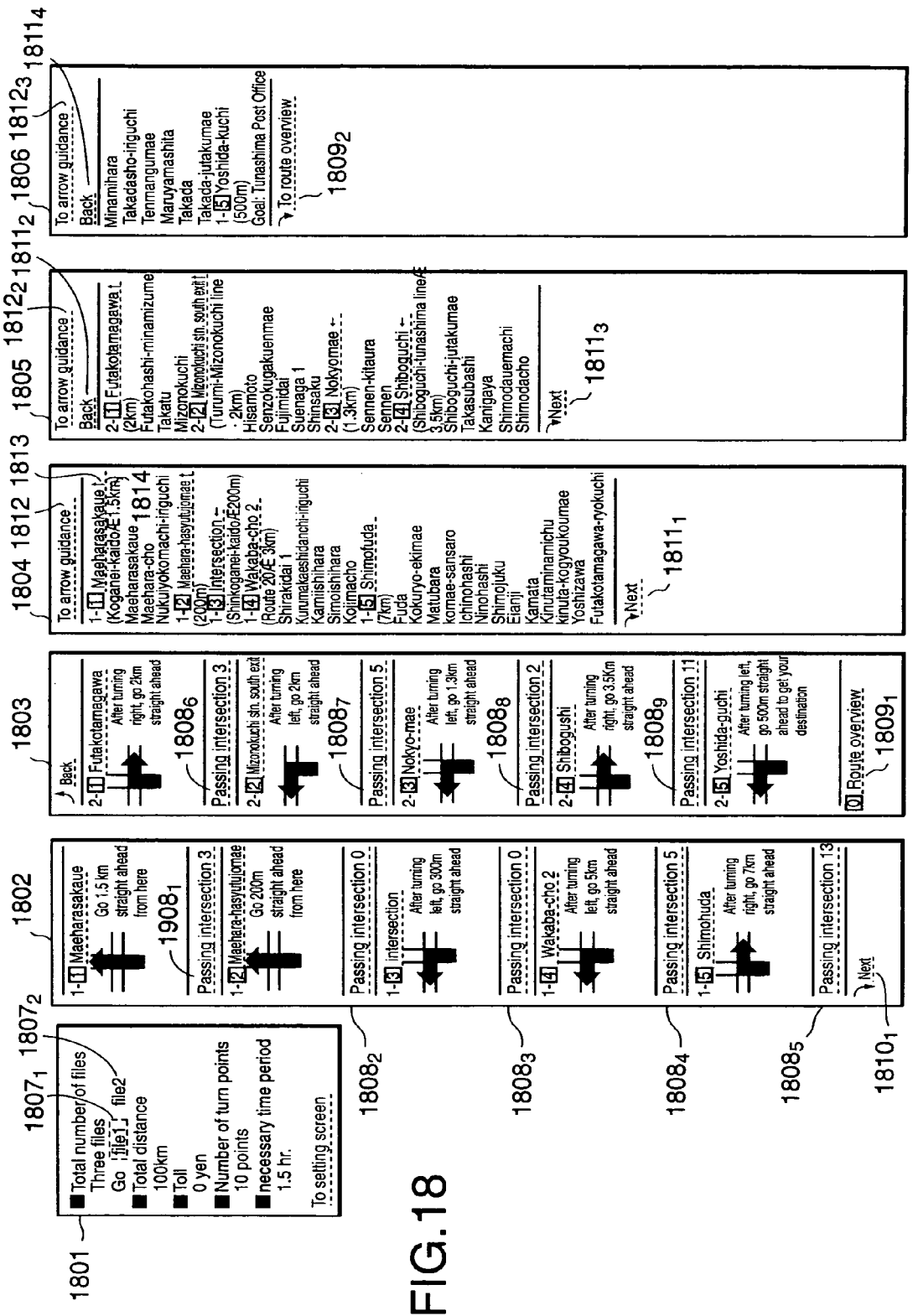
FIG. 18 is a diagram showing an example of a strip view of display images according to the second embodiment of the present invention.

In the second embodiment of the present invention, the center device 104 or the main body 401 of the standalone system in the first embodiment is such that the route guidance information generating means 1705 generates a route overview file in which information indicative of an overview of the entire route is described and a passing intersection guidance file in which the names of passing intersections on the guide route are listed as text information as shown in FIG. 18, in addition to the file as shown in FIG. 14 in which the directions to travel at the intersections as the guide points are represented with arrows. Then the route guidance information generating means 1705 sends out the files to the terminal 101 or 404, or the display means 402 so the files will be displayed thereon.

Figure 19:
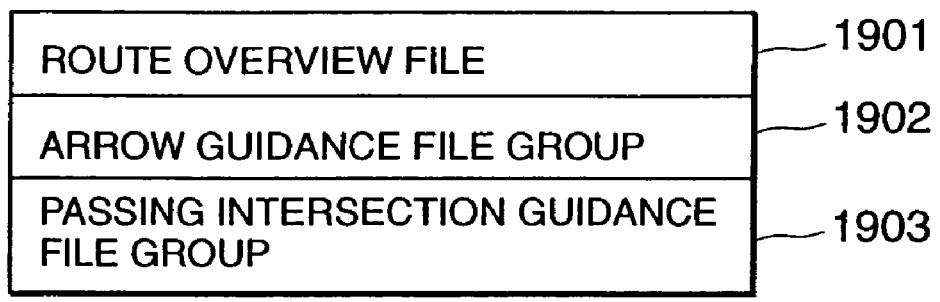
FIG. 19 is a diagram of the structure of a route guidance information group according to the second embodiment of the present invention.

FIG. 19 shows the structure of a route guidance information group generated by the route guidance information generating means 1705. In FIG. 19, a route overview file 1901 indicative of an overview of the entire route is composed of the number of files in an arrow guidance file group 1902, the total distance of the guide route, the toll, the number of arrow images, necessary time period, etc. The arrow guidance file group 1902 is composed of plural files, each of which indicates with an arrow the direction to travel at an intersection as a guide point. A passing intersection guidance file group 1903 is composed of a plurality of passing intersection guidance files, each of which represents the name of a passing intersection as text information.

FIG. 18 is a diagram continuously showing display images of the route guidance information group 1901 shown in FIG. 19. In FIG. 18, a strip view 1801 continuously shows display images of the route overview file 1901. Strip views 1802 and 1803, which are different files from each other, continuously show display images of the arrow guidance files 1902, respectively. Strip views 1804, 1805 and 1806, which are also different files, continuously show display images of the passing intersection guidance files 1903.

The contents of each view in FIG. 18 are as follows:

1801: A strip view of display images of the route overview file (the first level)

1802: A strip view of display images of file 1 of the arrow guidance files (the second level)

1803: A strip view of display images of file 2 of the arrow guidance files (the second level)

1804: A strip view of display images of file 1 of the passing intersection files (the third level)

1805: A strip view of display images of file 2 of the passing intersection files (the third level)

1806: A strip view of display images of file 3 of the passing intersection files (the third level)

Here, a display "file N" 1807 is to call a corresponding arrow guidance file 1902. A display "Passing intersection n" 1808 indicates the number of passing intersections between arrows in the arrow guidance file 1902, and provides a hyperlink to a corresponding passing intersection guidance file 1903. A display "To route overview" 1809 is used to return from the arrow guidance file 1902 and the passing intersection guidance file 1903 to the route overview file 1901, providing a hyperlink to the route overview file. Displays "Next" 1810, 1811 are used to jump to another file among the files of the arrow guidance file group 1902 and among the files of the passing intersection guidance file group 1903, respectively, assigning the character string "Next" to files each having the following file and the character string "Back" to files each having the preceding file. Both provide a hyperlink to jump to another file, respectively. A display "To arrow guidance" 1812 is used to jump from the passing intersection guidance file group 1903 to the arrow guidance file group 1902, providing a hyperlink on each passing intersection guidance file to a corresponding arrow guidance file 1902. A display 1813 represents with an arrow the direction to travel at an intersection accompanied with an arrow image on the arrow guidance file 1902. A display 1814 is located in a line next to an intersection accompanied with an arrow on the arrow guidance file 1902, representing a road name and distance to the next intersection accompanied with an arrow.

Description will be made next about the operation of the route guidance information generating means 1705 according to the second embodiment of the present invention. At first, it creates the arrow guidance files 1902 in a manner as shown in FIG. 12 without specifying a correct destination of a hyperlink to a corresponding file of the passing intersection guidance files 1903. At this time, the length of a file name to be given by the hyperlink is fixed so that the size of the output file in step 1205 will be prevented from changing due to a change in hyperlink destination.

Then the route guidance information generating means 1705 creates the passing intersection guidance files 1903. The following describes portions different from those in first embodiment on the basis of the operation flow of FIG. 12.

The passing intersection files 1903 are dependent on splitting of the arrow guidance files 1902, and processed on a file basis for corresponding one of the arrow guidance files. Suppose that the number of route guidance element records 1001 corresponding to one arrow guidance file is large. In this case, if the size of the main file exceeds the specified value N or the numeric key number X exceeds 9 in step 1205, a plurality of arrow guidance files are created for one arrow guidance file.

For example, in FIG. 18, the passing intersection guidance file 1804 corresponds to the arrow guidance file 1802, and the passing intersection guidance files 1805 and 1806 correspond to the arrow guidance file 1803.

Then, in step 1206 of FIG. 12, the numeric key X jump information 601 is outputted to only the route guidance element records 1001 whose guidance availability flags 1107 indicate the "presence" of the guidance information, together with the arrow 1813 representing a guide direction, and a road name and distance 1814 to a route guidance element record 1001 whose guidance availability flag 1107 indicates the "presence" that follows the current "presence" flag.

To the other route guidance element records 1001 with the "absence" flag, each intersection name is outputted as the numeric key X route guidance information 602 in step 1207 without outputting the numeric key X jump information 601.

Further, in step 1203 of FIG. 12, a hyperlink to an arrow guidance file is outputted to the top of a corresponding passing intersection guidance file 1903. If the passing intersection file is the second or the files that follow, the hyperlink 1811 to the immediately preceding passing intersection file is outputted.

Further, in step 1210, if unprocessed route guidance element records 1001 remain, hyperlink information to the next passing intersection file 1903 is outputted. After completion of the processing for all the records, hyperlink information to the route overview file is outputted.

Figure 25:
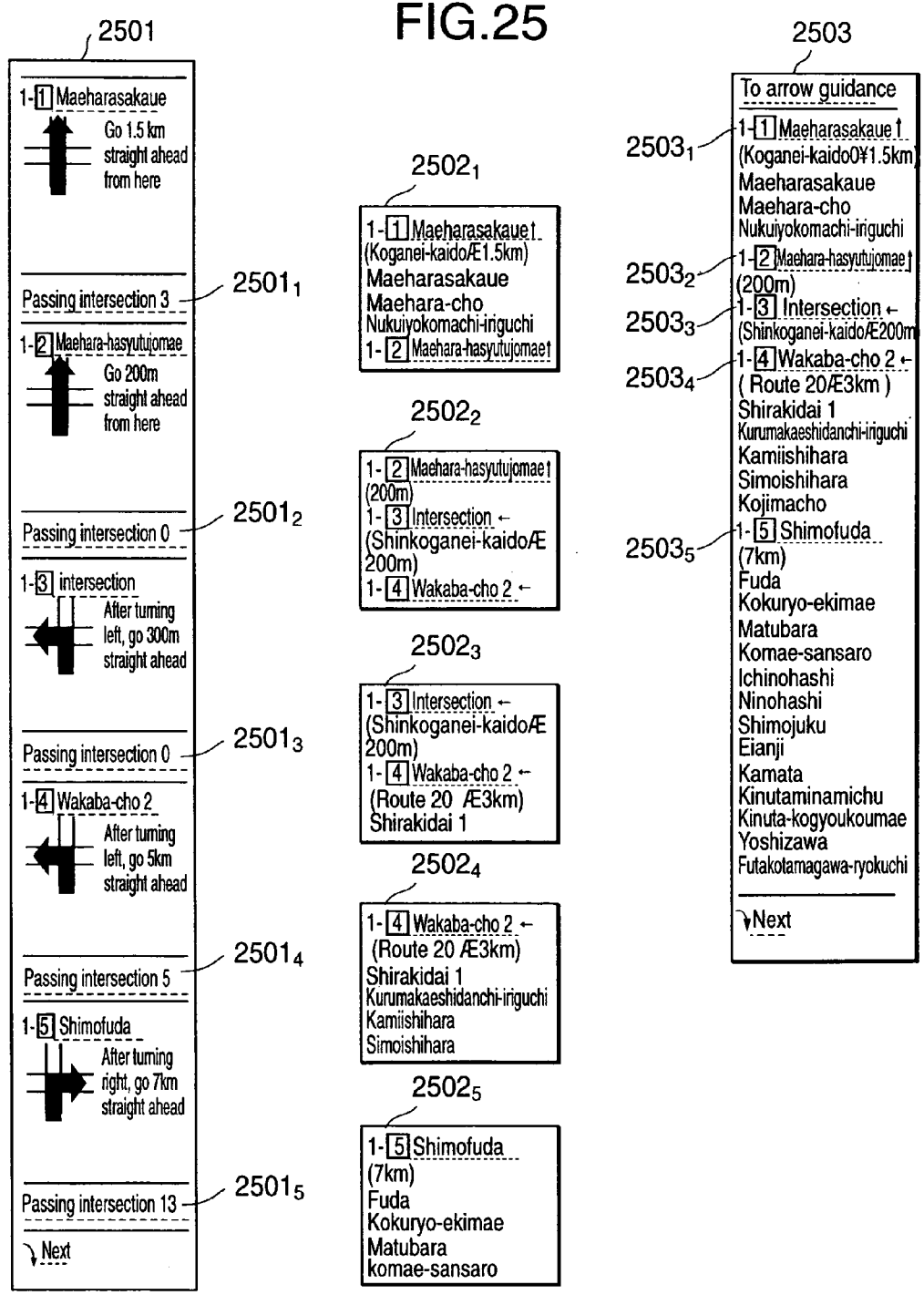
FIG. 25 is a diagram for explaining the operation of a terminal according to the second embodiment of present invention.

Referring next to FIG. 25, the operation of the terminal will be described. In FIG. 25, a continuous display screen image 2501 continuously shows display screen images of the arrow guidance files 1902, a continuous display screen image 2503 continuously shows display screen images of the passing intersection guidance files 1903, and a one-screen display images 2502 respectively show the passing intersection guidance files 1903 on a screen basis. The reference numerals in FIG. 25 are as follows:

2501: A strip view of display images of the arrow guidance files

25011–25018: Jump buttons to corresponding passing intersection guidance files.

2502: One-screen display image views of the passing intersection guidance files

2503: A strip view of display images of the passing intersection guidance files

25031–25035: Positions to which the numeric keys on the passing intersection guidance files are to be jumped Suppose in FIG. 25 that while the continuous display screen image 2501 is being displayed, the user operates the terminal to move the cursor and scroll the display to the position of the display screen "Passing intersection" 25011 and select it. In this case, since a hyperlink is set from the display screen "Passing intersection" 25011 to the display position 25031 of the continuous display screen image 2503, the terminal displays the display screen 25021 of the one-screen display images 2502. Suppose further that while the continuous display screen image 2501 is being displayed, the user operates the terminal to move the cursor and scroll the display to the position of the display screen 25015 and select it. In this case, since a hyperlink is set from the display screen 25015 to the display position 25035 of the continuous display screen image 2503, the terminal displays the display screen 25025 of the one-screen display images 2502.

As stated in the first embodiment, the terminal can instantaneously display each arrow image in response to a press of a numeric key during the display of the continuous display screen image 2501. This has an effect that the user can move the cursor to the display 25015 with less trouble.

When any one of the displays 25011 to 25015 is selected, since the terminal has already received the passing intersection guidance files 1903, presses of the numeric keys 1 to 5 in this order on the terminal during the display of the continuous display screen image 2503 can result in instantaneous displays of corresponding positions on the continuous display screen image 2503 from the display 25021 to the display 25025.

Thus a list of character strings of the passing intersections is displayed, which makes them possible for the user to confirm an on-site intersection name and a corresponding character string of the passing intersection guidance file during traveling and judge whether the user is traveling on the guide route. Further, the same numeric keys can be used commonly for the arrow guidance files and the passing intersection files, so that guide points can be displayed one after another, thus providing easy-to-understand guidance. In FIGS. 18 and 25 the display of the traveling direction and distance on the road to the next guide point are fixed on the right side of the display screen on which the traveling direction of the present guide point is represented with an arrow. However, they are not limited thereto, and may be located at the tip of the arrow on the display screen on which the traveling direction is represented with the arrow, for example.

THIRD EMBODIMENT

Figure 21:
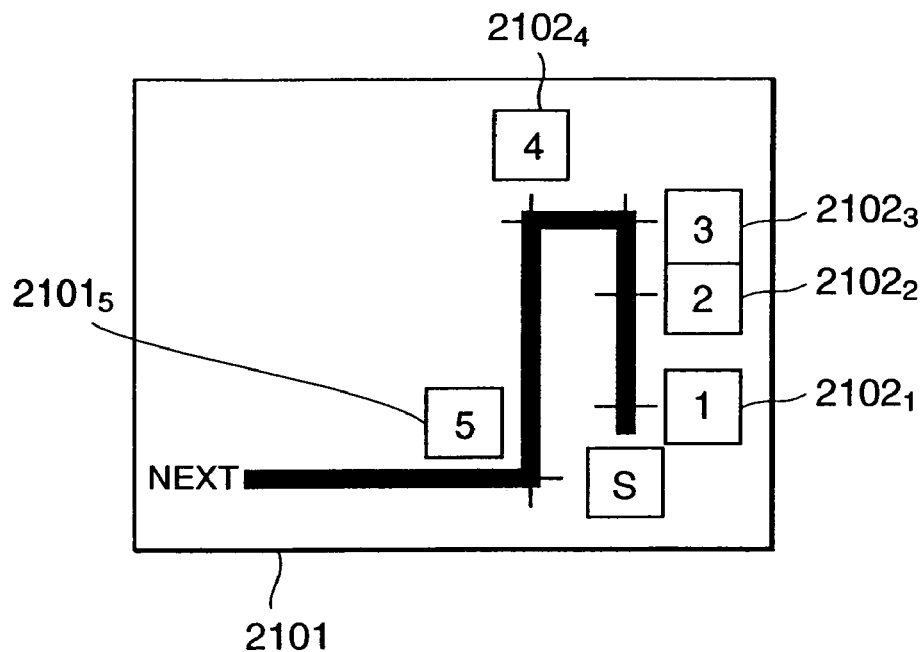
FIG. 21 is a diagram showing an example of a display image according to the third embodiment of present invention.

In the third embodiment of the present invention, the center device 104 or the main body 401 of the standalone system in the first embodiment is such that the route guidance information generating means 1705 generates a route guidance simplified map as shown in FIG. 21 and sends out the same to the terminal 101 or 404, or the display means 402 so that the simplified map will be displayed thereon.

Figure 22:
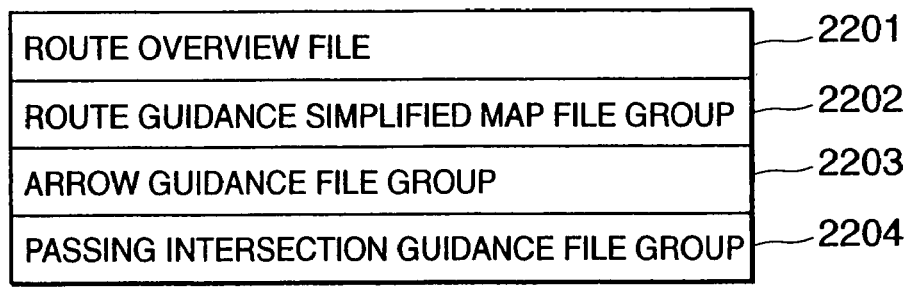
FIG. 22 is a diagram of the structure of a route guidance information group according to the third embodiment of present invention.

FIG. 22 shows the structure of a route guidance information group generated by the route guidance information means 1705.

In FIG. 22, a route overview file 2201 indicative of an overview of the entire route is composed of information on the number of files in an arrow guidance file group 2203, the total distance of the guide route, the toll, the number of arrow images, necessary time period, etc. A route guidance simplified map file group 2202 is composed of files representing simplified maps of plural guide routes.

The arrow guidance file group 2203 is the same file group as that described in the first and second embodiments, and a passing intersection guidance file group 2204 is the same as that described in the second embodiment.

Figure 23:
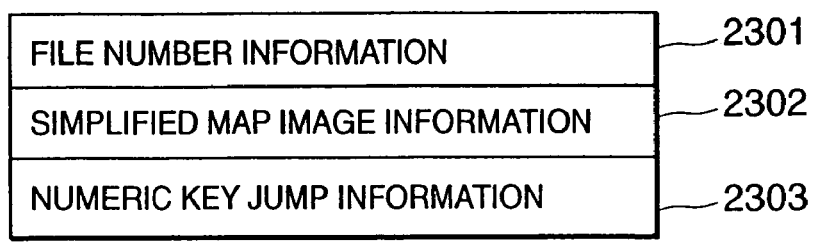
FIG. 23 is a diagram of the structure of a route guidance simplified map file according to the third embodiment of present invention.

FIG. 23 shows the structure of the route guidance simplified map files 2202. In FIG. 23, file number information 2301 is composed of a character string indicative of how manieth file it is. Simplified map image information 2302 is composed of a character string indicative of an image file of a simplified map, and numeric key jump information 2303 is composed of a character string indicative of a destination to which the display is jumped in response to a press of a corresponding numeric key.

Figure 24:
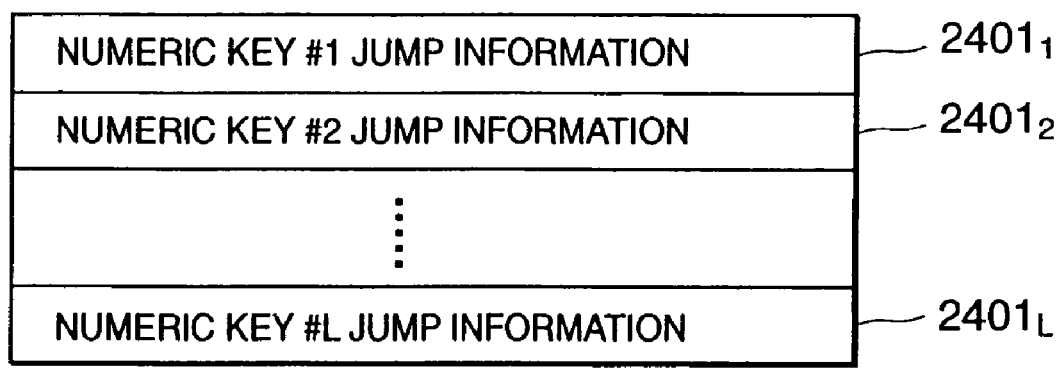
FIG. 24 is a diagram of the structure of numeric key jump information 2303 according to the third embodiment of present invention.

As shown in FIG. 24, the structure of the numeric key jump information 2303 in FIG. 23 includes plural pieces of numeric key X jump information 2401, such as numeric key #1 jump information, numeric key #2 jump information, . . . , numeric key #L jump information, where L is the maximum value of the numeric keys corresponding to numeric and external characters used in the simplified map.

FIG. 21 shows a display image of the route guidance simplified map file group 2202.

In FIG. 21, a route guidance simplified map 2101 is displayed as a simplified map to show the guide route, emphasizing the guide route. I-displays 2102 are indicated by numeric and external characters and placed on the right side of the traveling direction of the guide route to point out on the simplified map the positions of the locations where the information representing with arrows the directions to travel at the intersections exists in the arrow guidance file.

Description will be made next about the operation of the route guidance information generating means 1705 for generation of the route guidance simplified maps according to the third embodiment. At first, the width and length of an image, together with the size of its numeric and external character and distance 1102 to the next guide point, are calculated from the arrow information 1108 for route guidance element records 1001 whose guidance availability flags 1107 indicate the "presence" to judge whether all the route guidance element records 1001 fit in the full-screen size of the display screen. If they fit in the full-screen size of the display screen, the length of each line segment will be determined from the number of line segments in the lateral and vertical directions to create an image file.

If they do not fit in the size of the display screen, a plurality of route guidance simplified maps 2101 will be created. In this case, a plurality of guidance information files with arrow images shown in FIGS. 14, 15 and 16 are created, assigning a numeric key starting from 1 to each piece of guidance information on a file basis. If the route guidance simplified maps 2101 are different from each other, corresponding passing intersection guidance files 2204 will also be different files. Further, if information on passing intersection names corresponding to one route guidance simplified map 2101 exceeds the set value of the output file, the route guidance simplified map will be composed of further different files.

Figure 26:
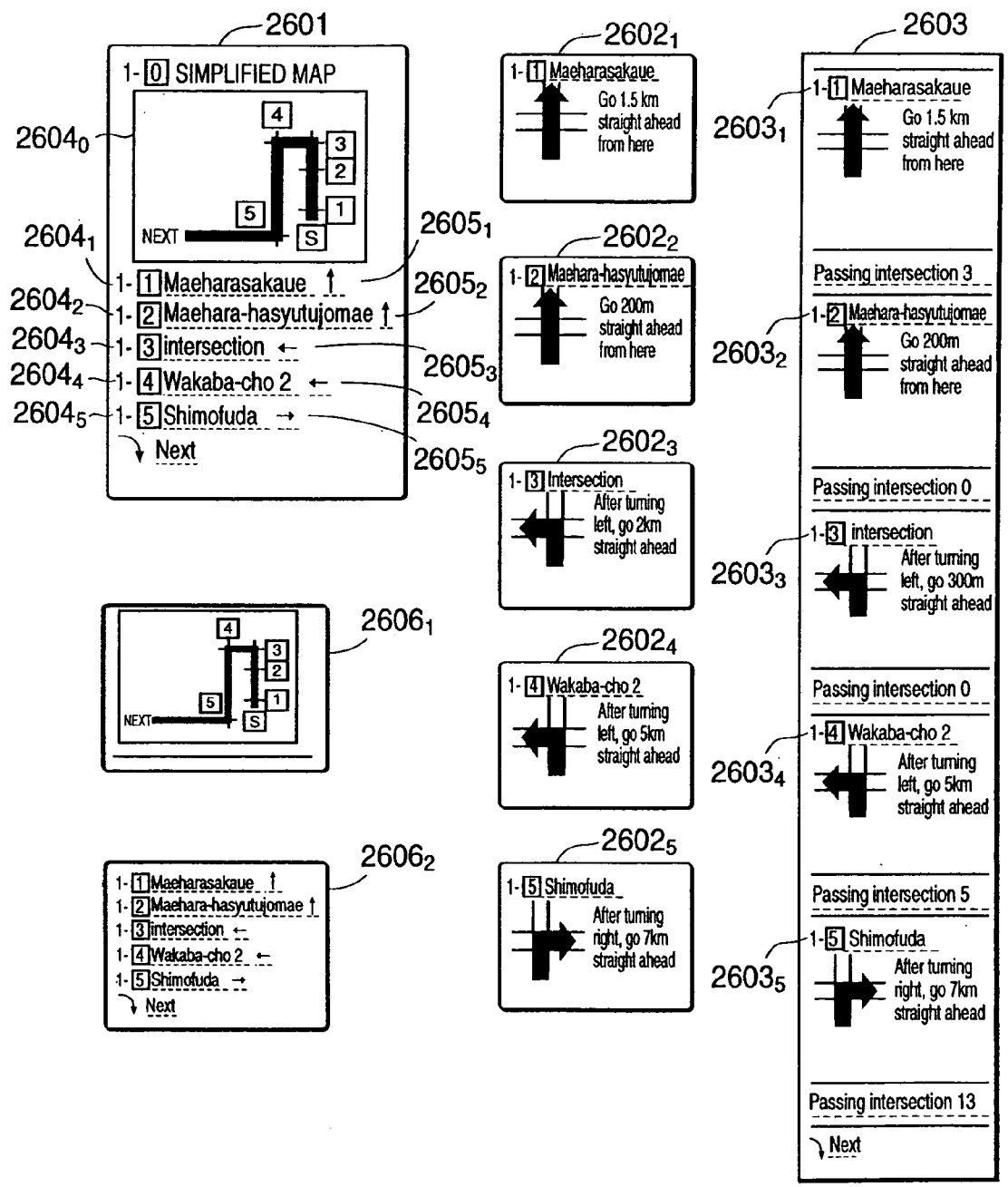
FIG. 26 is a diagram for explaining the operation of a terminal according to the third embodiment of present invention.

Referring next to FIG. 26, the operation of the terminal according to the third embodiment will be described. In FIG. 26, a simplified map 2601 is a strip view of display screen images of the route guidance simplified map files 2202, one-screen display simplified maps 2606 show display images of the route guidance simplified map files 2202 on a screen basis, and I-displays 2604 indicate display positions that are in a one-to-one correspondence with the numeric keys. A continuous display image 2603 is a strip view of display images of the arrow guidance files 2203, and one-screen arrow guidance displays 2602 show display images of the arrow guidance file group 2203 on a screen basis. Position displays 26021 to 26035 indicate display positions that are in a one-to-one correspondence with the numeric keys on the arrow guidance file 2203, arrow displays 2605 represents, with arrows as character information, traveling directions at respective guide points on the route guidance simplified map file 2202. Here, a hyperlink to each of the displays 2605 to a corresponding guidance file 2203 is placed.

The contents of each view in FIG. 26 are as follows:

2601: A strip view of display images of the route guidance simplified map files

2602: One-screen views of display images of the arrow guidance files

2603: A strip view of display images of the arrow guidance files

2604: Positions of numeric key jump destinations on the route guidance simplified map file

2605: Jump buttons to the arrow guidance file

2606: One-screen views of display images of the route guidance simplified map files

26031–26035: Positions of numeric key jump destinations on the route guidance simplified map file Suppose in FIG. 26 that the numeric key 1 is pressed on the terminal during the display of the simplified map 2601. In this case, since the hyperlink to the display 26041 is set, the display screen moves to the state of the display 26062 and the cursor moves to the position of the display 26041. Suppose further that the numeric key 0 is pressed. In this case, since the hyperlink to the position of the display 26040 is placed, a simplified map that fits in the full size of one screen like the display 26061 is displayed.

Furthermore, if the numeric key 2 is pressed, since the hyperlink to the position of the display 26042 is placed, the display screen will move to the state of the display 26062 and the cursor will move to the position of the display 26041.

Thus the simplified map and the intersection names at the guide points on the simplified map can be displayed and confirmed one after another without the need to call another file.

Then, if the cursor located at the position of the display 26042 in response to the press of the numeric key 2 on the terminal is one-clicked in the downward direction, and moved to the position of the display 26051 to select it, since the hyperlink from the display 26051 is placed to the position of the display 26031, the terminal will receive the continuous display image 2603 describing more detailed information to move the display screen to the display 26021.

From this condition, if the numeric key 5 is pressed from the numeric key 1, the display screen will be switched from the display 26021 to the display 26025. These are assigned the same numbers on the simplified map 2601, which makes it easy for the terminal user to imagine the guide route.

Thus, the route overview is graphically displayed, which makes it easy for the user grasp the global position. From the numeric and external characters displayed on the route guidance simplified map, the user can also know what numeric key is displayed in quick response to a press of a numeric key. Further, even if the guidance information is continued to the next file, since the numeric keys are assigned on a file basis, the user can easily grasp the operation rule.

As long as any of the arrow displays 2605 is pressed during the display of the simplified map 2601, the terminal can receive the continuous display image 2603 and move the display position to the position of the arrow guidance file corresponding to the pressed key number. Further, the number of key presses are just three, that is, the numeric key is once, the position below the cursor once, and the selection key once. Suppose that the display positions are in no correspondence with the numeric keys. For example, if the cursor is at the display 26041 and is to move to the display 26055, the position below the cursor needs to be pressed nine times. In contrast, the correlation with the numeric keys reduces the number of key presses to three.

The route guidance simplified map and the arrow route guidance file may be combined into the same file as shown in FIG. 27. In this case, the two files are combined into one file after the upper limit to the size of the route guidance simplified map and the upper limit to the size of the arrow guidance file are preset independently of each other to create both files respectively.

Further, if map extraction means is provided for extracting from the map storage means 1706 map information corresponding to the route guidance information outputted from the route guidance information generating means in FIG. 17 so that the map information will be sent out to the terminal together with the route guidance information, more sophisticated guidance will be possible. For example, if present position calculating means is provided in the terminal so that the present position of its own device will be calculated, the terminal can display corresponding route guidance information before a guide point.

Furthermore, if voice information created by coding guidance voice is contained in the route guidance information while providing the terminal with means for sounding the voice information, the corresponding voice data can be sounded before the guide point.

The route guidance element generating means 1703 in FIG. 17 needs to be provided with a large-capacity RAM and a CPU capable of high-speed processing for reading all the map information corresponding to the route result 1702 from the map storage means 1706 to judge whether it comes close to a guide point. On the other hand, since the route guidance information generating means has only to generate information from the route guidance element 1704 as an output form the route guidance element generating means 1703, it can perform processing even with a small-capacity RAM and low-speed CPU compared to the route guidance element generating means 1703. Therefore, if the route guidance element is sent out from the center and the route guidance information is created on the terminal side, more sophisticated guidance will be made possible, such as to customize the size of the display screen on the terminal side or make an image more visible, while keeping the price of the terminal low compared to such a case that the terminal has all the functions.

In addition, the route guidance information 1707 generated by the route guidance information generating means 1705 can be stored on a storage medium, which makes it possible to use user-friendly route guidance information on various terminals.

FOURTH EMBODIMENT

As shown in FIG. 1, a communication-type navigation system according to the fourth embodiment of the present invention is such that the center 104 transmits route information, obtained by searching the map 106 connected thereto through the map 105 or the information network 103, to the communication terminal 101 (hereinafter called the terminal) from the gateway 102 connected through the information network 103 to show the user a route. The terminal 101 operates according to a communication protocol or an application language suitable for use in a network. In other words, the terminal 101 is an Internet-ready portable telephone, such as an i-mode portable telephone operable in compact HTML or HTML, or a WAP-ready mobile communication terminal. The gateway 102 interconnects the terminal with the information network 103 such as the Internet. The center 104, for example, is a WWW server, and is connected to the information network 103 to communicate with the terminal 101 and provide route search and route guidance services. The user operates the communication terminal 101 so that the service will be available. The map 105 is a database from which the center 104 searches for a route, retrieves a search point and creates guidance data. It should be noted that the center 104 can also use the map 106 placed in another location on the information network.

The operation of the communication-type navigation system configured such above will be described with reference to FIG. 2. At first, the user sets a starting place and a destination in step 1. This process will be described with reference to FIG. 3. The user selects a setting mode from the starting place setting screen transmitted from the center 104. Assuming that setting is started from an intersection, the user selects "1" so that the intersection name entry screen will be displayed. The user enters an intersection name to set the starting place. Then, when the user sets the destination in a similar manner, the center 104 searches a route and outputs a route guidance map so that the route guidance map will be displayed on the terminal. FIG. 4 shows this situation.

As mentioned above and according to the embodiment of the present invention, the starting place and the destination can be entered without any modification to the existing communication terminal. Since the map data are held on the center 104 side or on the Internet 103, the terminal 101 does not need to hold any map, which makes it possible to realize a simple navigation function without any modification to an existing low-range communication terminal.

Although the guidance screen is shown in FIG. 4, the plurality of intersection guidance screens should be sent in the form of a file to reduce the number of accesses. However, since the terminal 101 has a limited reception capacity, the center needs to divide the file properly so that the size of a file will not exceed the capacity of the terminal. If the terminal sends its model name or reception capacity to the center, the center can divide the file properly regardless of whether or not the reception capacity is known.

FIFTH EMBODIMENT

Most of the presently popular Internet-ready portable telephones do not have a positioning function, which makes it difficult to realize practical navigation in any conventional manner. If the communication terminal 101 does not have the positioning function, a special contrivance will be required for entries of the starting place and the destination or the navigation method. Further, since the navigation is to give driving instructions, it is desired that screen operations should be as easy as possible.

If the starting place or the destination is not located on main roads, route guidance dependent on the intersection or road names will also be difficult. In addition, a mechanism for letting the user know a correct direction (initial geographical orientation) to be headed at the start of the drive.

Figure 28:
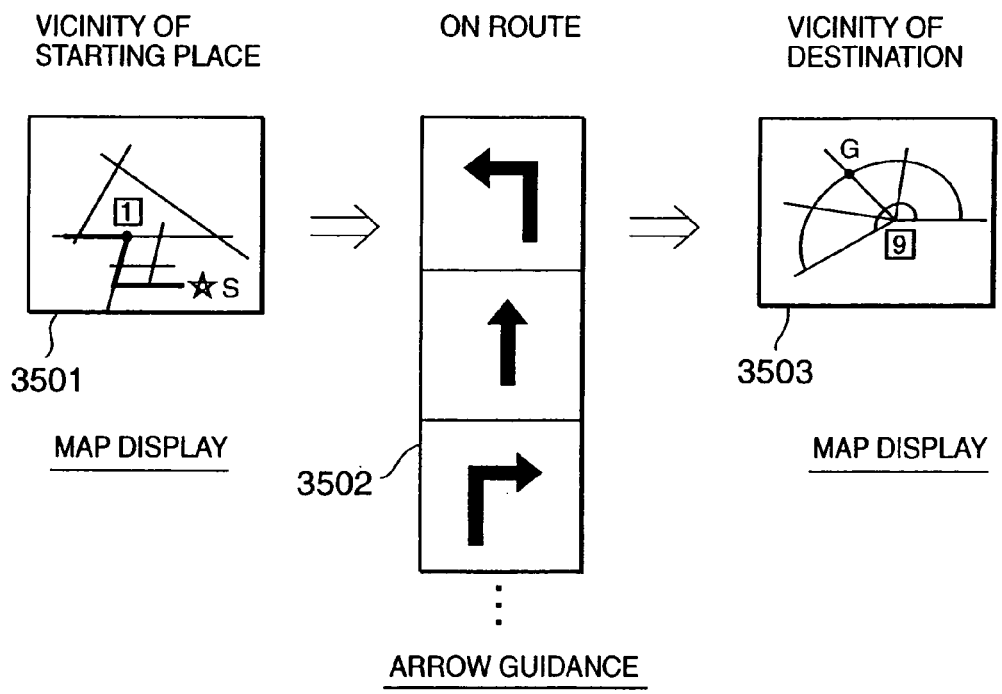
FIG. 28 is a diagram showing a specific example of map display of the vicinity of a starting place and a destination according to the fifth embodiment of present invention.

FIG. 28 shows the structure of guidance screens according to this embodiment of the present invention. It is desired that the center 104 should extract a starting place detailed map display 3501 and a destination detailed map display 3503 from the map data, and display them while emphasizing the route with a heavy line or in different color. The terminal obtains the displays before and after an arrow guidance display 3502. It should be noted that toll road sections may be displayed in further different color.

The map display screens 3501 and 3503 may also be extracted at another center, rather than the center 104, for example, a known map providing WWW server. In this case, it can be realized as a hyperlink to such a site.

As stated above and according to the embodiment, even if the starting place or the destination is away from the main roads, a map can be displayed at such a place, so that the user can drive based on the detailed map 3501 until the user exits from a main road and the detailed map 3503 in the vicinity of the destination. If the map is displayed at some midpoint on the route, the user may feel annoyed to view the map. Therefore, simple guidance to show only intersection or road names, turn directions at and distances to guide points is performed to facilitate the user convenience.

SIXTH EMBODIMENT

Figure 29:
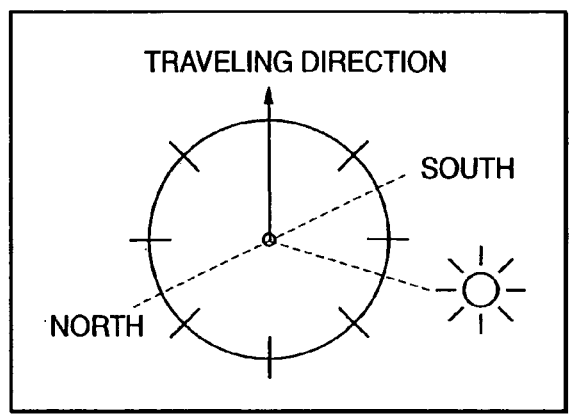
FIG. 29 is a diagram showing a specific example of a display screen showing an initial geographical orientation according to the sixth embodiment of present invention.

There is a case where input of a main point or points on the route is required during the route guidance in response to the needs of the user. For example, even if the user starts from a main road, the initial direction may be uncertain. In such a case, some contrivance is desired so that the user can start driving in the correct direction. FIG. 29 shows the position of the user's bearings relative to the position of the sun as an example of an initial direction screen. The center 104 calculates the direction of the sun from the current time and the position of the terminal 101 to create it as an image as shown in FIG. 29. It is desired that another celestial body such as the moon be displayed depending on the time of day.

FIG. 30 shows, as an example of another initial geographical orientation screen, the relationship between the user's bearings and the direction of a landmark (tower), which will be possibly viewed from the location. When these directions are determined at the center and displayed, the user can get the correct initial geographical orientation even on a rainy day or at night. In other words, the center prerecords the landmark as a target object together with its coordinates. Then the center determines the direction of the landmark from the coordinates of the starting point and the coordinates of the landmark to create FIG. 30.

It should be noted that the absolute orientation of the user's bearings can also be displayed as a numeric value to find the geographical orientation in conjunction with a compass.

SEVENTH EMBODIMENT

An approach opposite to that of the preceding embodiment is also conceivable. In this case, the user informs the center of the geographical orientation so that the center will perform route search and guidance based on the geographical orientation. When the user drives a car, there are many cases where a change of direction requires time or traffic control forbids the user to change direction. It is therefore desired that such cases should be considered in the process of route computation. To do this, a method may be considered in which the user informs the center of the absolute orientation when setting the starting place, but few users generally know the absolute orientation.

Suppose in FIG. 31 that the user is driving from an intersection "Umedabashi" toward another intersection "Higashikata-cho." In this case, if the user sets the starting place when passing through the Higashikata-cho intersection, the user can enter both of the preceding intersection "Umedabashi" and the present intersection "Higashikata-cho" to inform the center of the user's traveling direction.

Then the center extracts the two intersections from the map data to determine a link therebetween. Thus the link that fits in the direction in which the user is traveling can be set as the starting place. Since the route result thus searched becomes a route that fits the direction in which the user is driving, more user-friendly guidance can be performed.

EIGHTH EMBODIMENT

When the user sets an intersection for the starting place, a list of a plurality of possible intersections can be displayed so that the user will select one therefrom. Further, even when the user sets the starting place or destination from a telephone number, zip code, address, facility name or latitude/longitude information, nearby intersections can be listed so that the user will select one therefrom.

Figure 33:
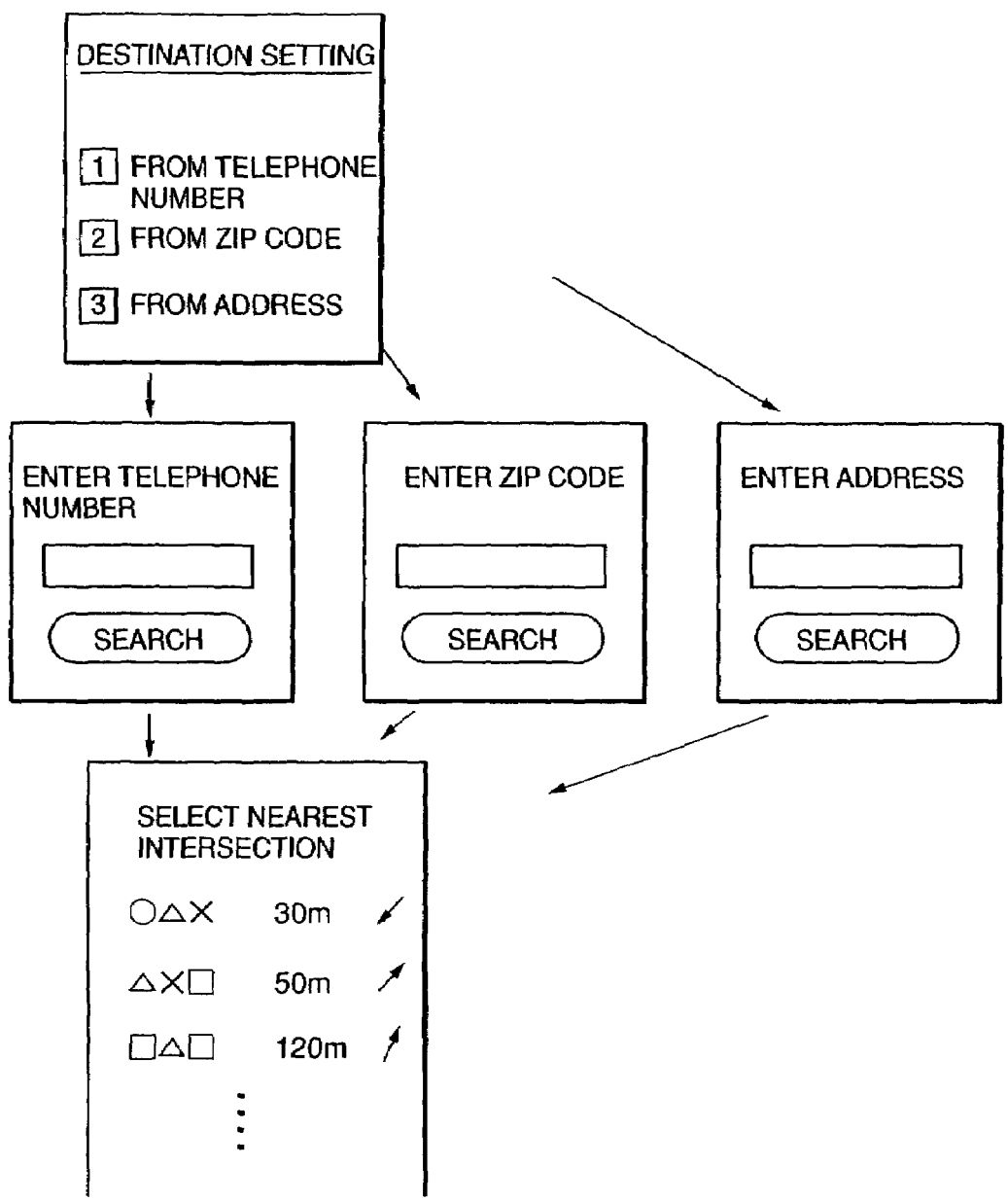
FIG. 33 is a diagram showing a specific example of transitions of an intersection name selection screen according to the eighth embodiment of present invention.

In other words, when the user enters a true point, the center performs a step of extracting the latitude and longitude of the point from the map data, a step of extracting the names of intersections in the vicinity of the latitude and longitude, and a step of outputting a list of the intersections as a selection screen. Thus the intersection selection list of FIG. 33 is obtained. It is desired that information indicative of distances and directions from the real point be added to the intersection list.

Even when the destination is away from main roads or intersections, this method allows the user to select an intersection, which makes it possible provide reliable guidance information until the user reaches the intersection.

Figure 3:
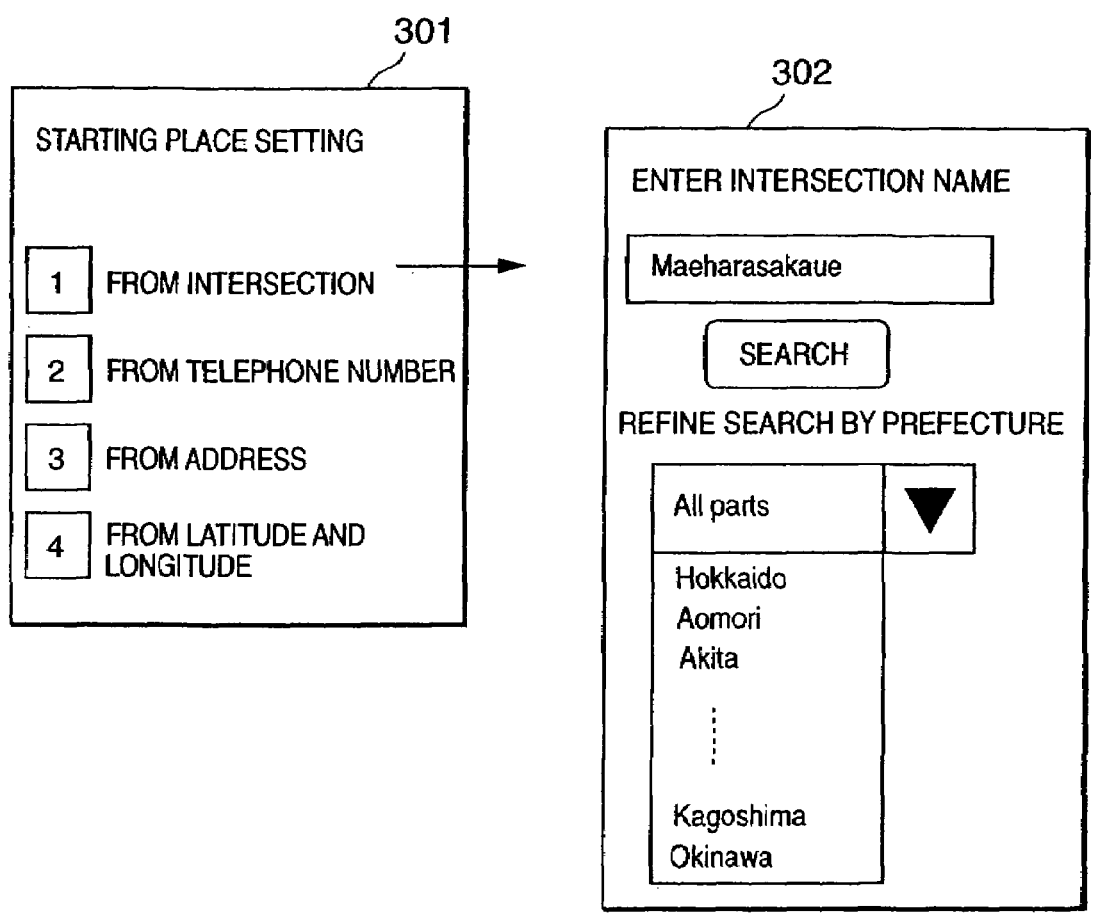
FIG. 3 is a diagram showing screen images of input means according to the embodiments of the present invention, the diagram also showing a specific example of an input/output interface according to the fourth embodiment of the present invention.

If the terminal 101 is capable of inputting Kanji or Chinese characters, the user can enter the intersection name in Kanji to retrieve it even when the readings of the intersection written in Kanji are unknown. The correct readings of the intersection "xxxx" illustrated in FIG. 3 are "maeharasakaue," but retrieval is possible even if the user does not known the correct readings.

NINTH EMBODIMENT

Figure 34:
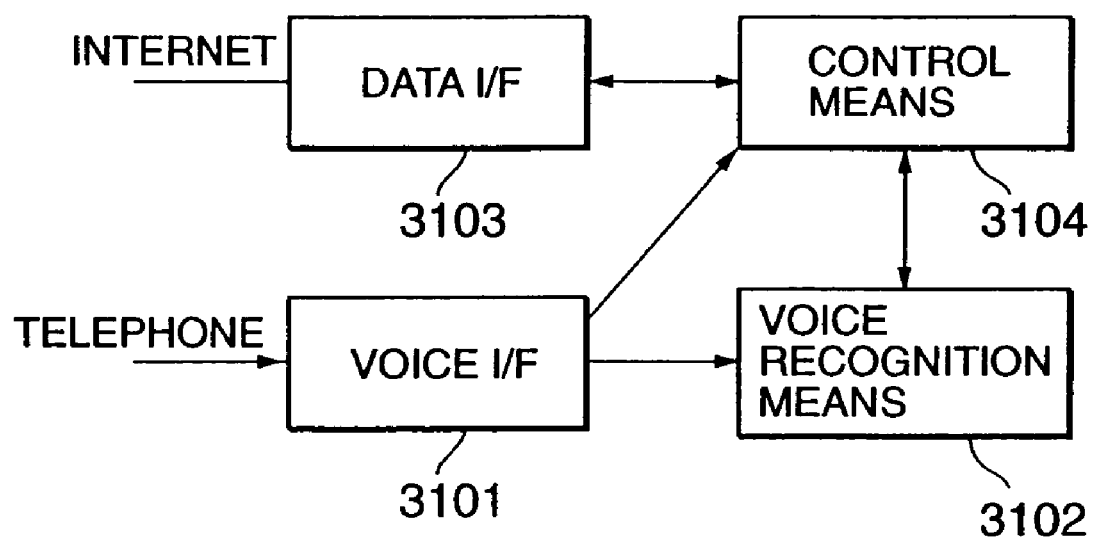
FIG. 34 is a block diagram for explaining voice input according to the ninth embodiment of present invention.
Figure 35:
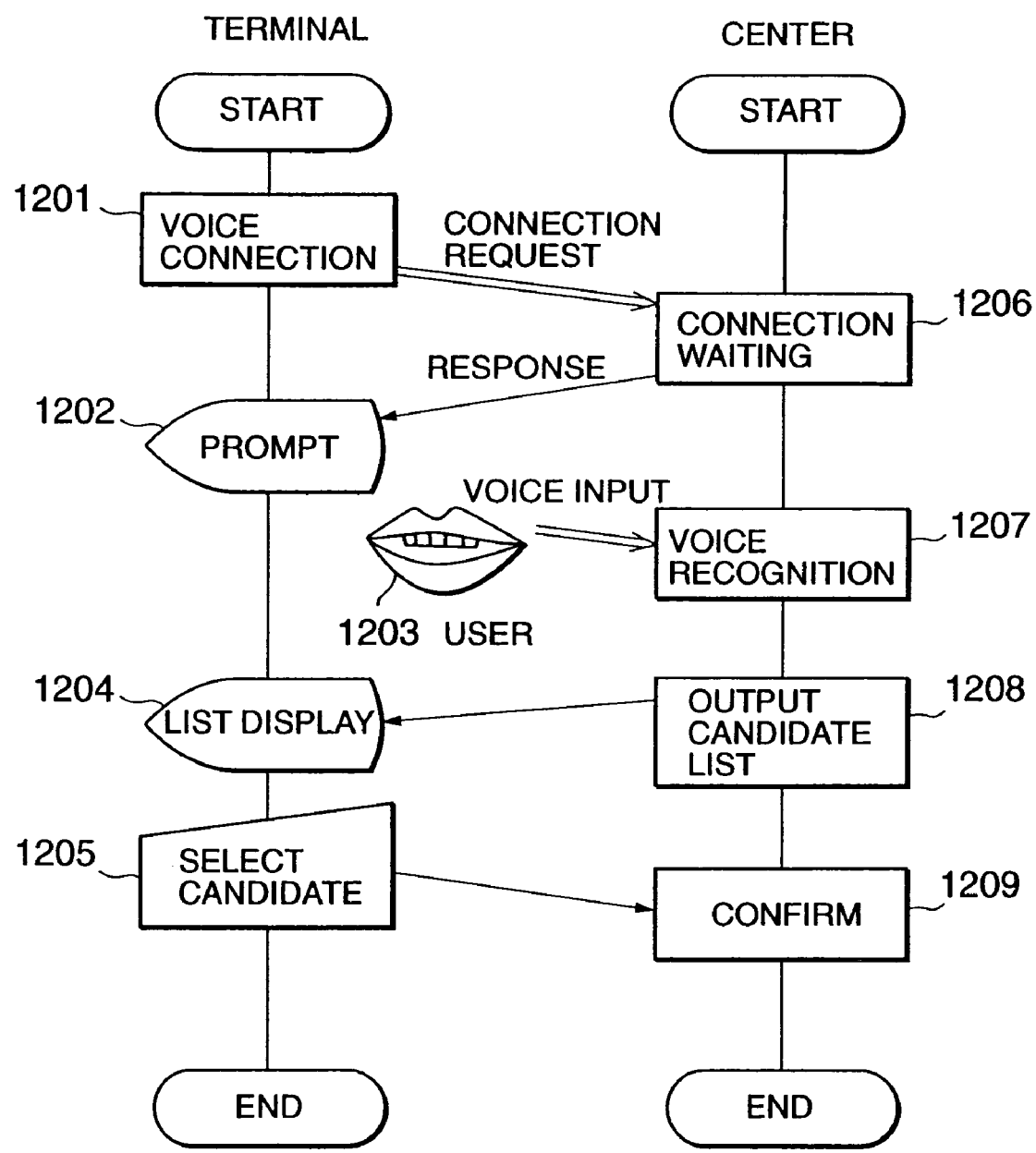
FIG. 35 is a flowchart for explaining voice input according to the ninth embodiment of present invention.

An embodiment using a voice-entry scheme will be described with reference to FIGS. 34 and 35. In FIG. 34, a voice interface 3101 receives an input from voice communication means such as a telephone. Voice recognition means 3102 recognizes the voice inputted from the voice interface 3101. A data interface 3103 is a data interface which performs data interchange with a network such as the Internet. Control means 3104 is to output display data to the data interface 3103 on the basis of the recognition result from the voice recognition means 3102.

The operation of the embodiment will be described with reference to FIG. 35. In step 1201, a voice channel is connected to the center to start voice input. The center that waits for connection in step 1206 responds with voice-entry prompt display data to the transmission of an incoming control signal from the voice interface 3101 to the control means 1304. Then, in step 1202, the display data is displayed on the terminal. The user starts talking in step 1203 to get the center to recognize the voice through the voice channel that was opened a little while ago. At the center, the voice recognition means 3102 recognizes the voice inputted from the voice interface 3101 to inform the control means 3104 of the recognition result. The control means 3104 creates a list of recognition candidates to output the same to the data interface 3103. The list of candidates thus outputted in step 1208 is displayed in step 1204 on the terminal side. The user selects on the terminal a correct one from the list of candidates (step 1205), and the selection result is confirmed on the center side (step 1209).

As stated above, concurrent use of the voice channel allows the terminal side to save the user time and trouble. Such a method that voice is converted to data on the terminal side and sent through a data network is also conceivable.

TENTH EMBODIMENT

Figure 36:
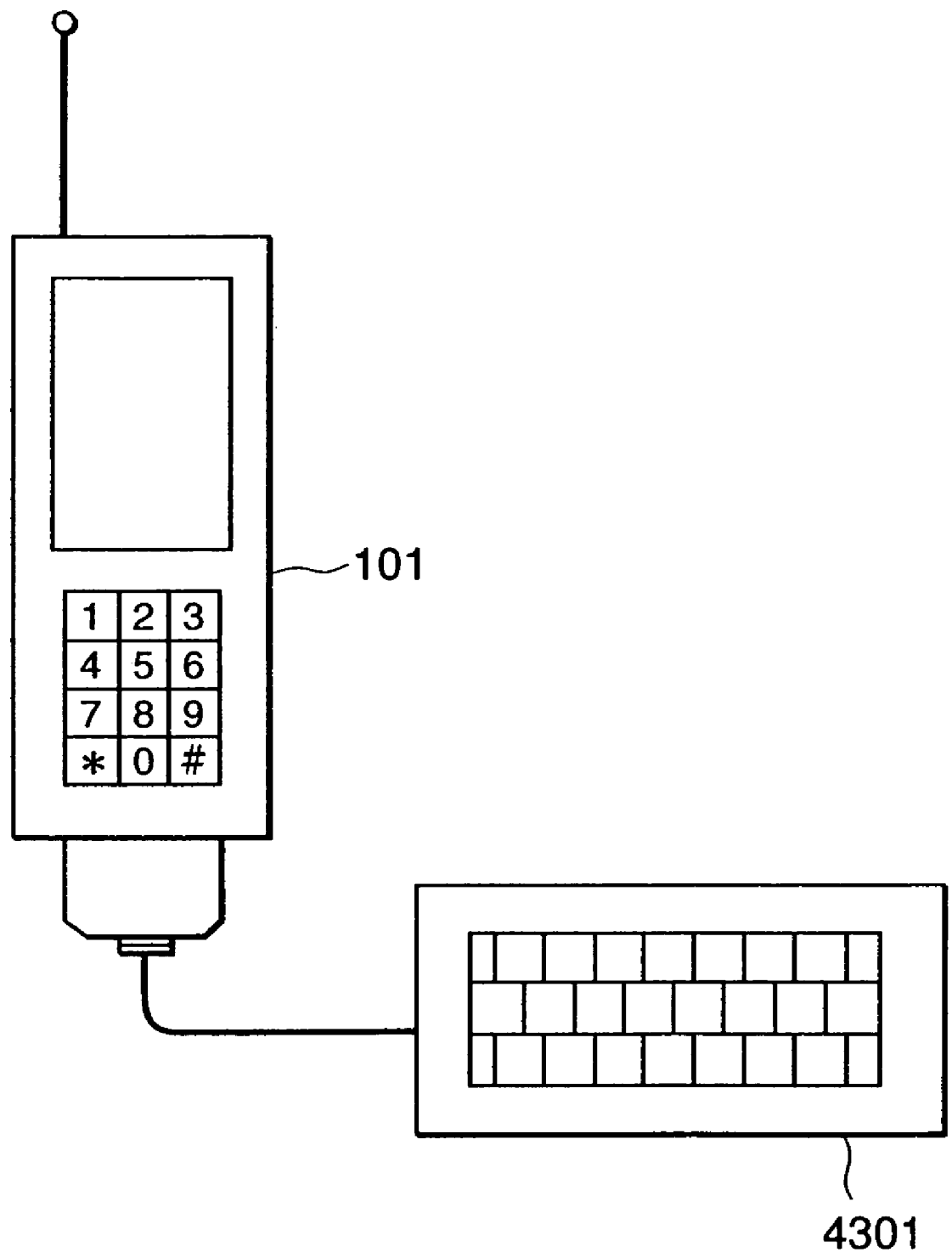
FIG. 36 is a diagram showing a specific example of a communication terminal according to the tenth embodiment of the present invention.

An embodiment using an external keyboard will be described with reference to FIG. 36 as another method of simplifying input operations. A keyboard 4301 is connected to the terminal 101.

In the case of a large amount of input such as to enter an address or intersection name, the external keyboard 4301 can be connected to the terminal 101, which makes possible smooth input.

ELEVENTH EMBODIMENT

Figure 37:
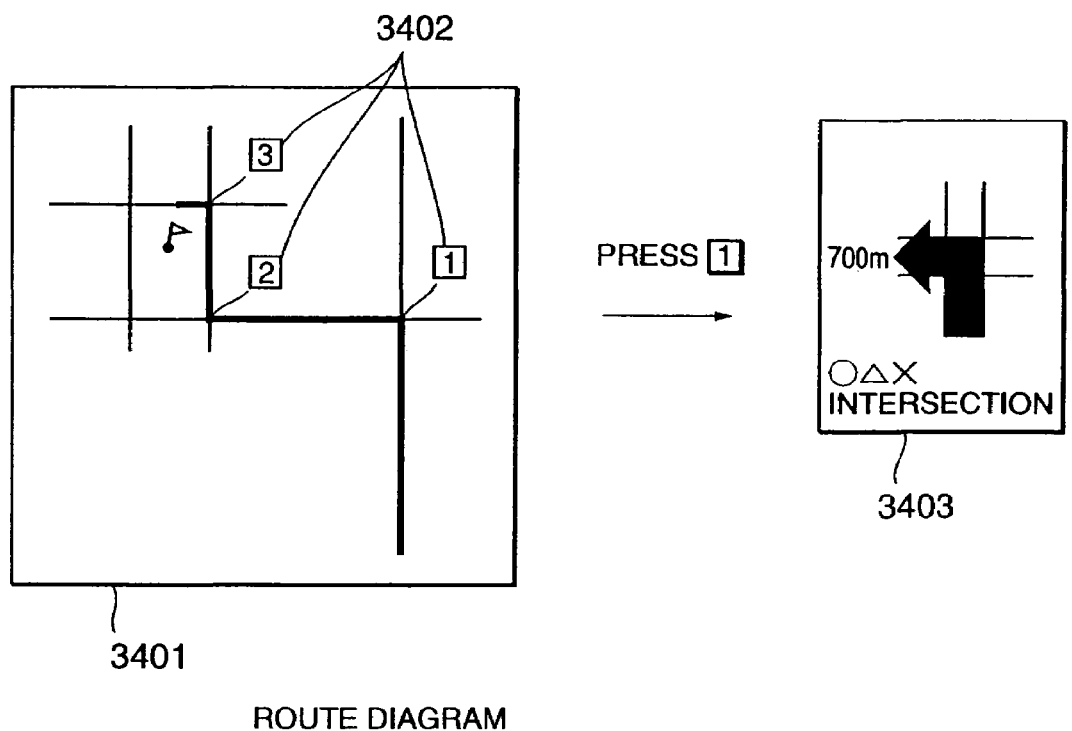
FIG. 37 is a diagram showing a specific example of screen transitions according to the eleventh embodiment of present invention.

The functions of the terminal 101 may be switched in response to the needs of the user. For example, the route map display is switched to a corresponding intersection display. This embodiment will be described with reference to FIG. 37. A route diagram 3401 displays a route diagram in the form of a map or simplified map with numeric labels 3402 attached at respective guide points. On the display, the driving route is emphasized. Then a hyperlink is placed between each of the numeric labels 3402 and corresponding intersection guidance. For example, when the user presses "1" during the display of the route diagram 3401, a corresponding intersection guidance diagram 3403 is displayed.

The route overview is graphically displayed, which make it easy for the user to grasp the global position. Further, the numeric labels displayed on the map makes it easy to bring the route diagram into correspondence with the intersection guidance diagrams.

TWELFTH EMBODIMENT

There is a case where the user wants to tell another person the searched route in addition to the case the user uses it for himself or herself. This is realized using a URL as shown in FIG. 38. In other words, the URL may contain the latitude and longitude of a starting place, the latitude and longitude of a destination, a search mode indicative of priority/nonpriority to charges and the like, and the version of a map. It is also desired that places located on the way to the destination be specifiable.

If the access is to the same site, the use of above-mentioned URL can output a reproducible route, which makes it possible to exchange route information using text-based media such as e-mail.

THIRTEENTH EMBODIMENT

The search operation can be devised to realize a further convenient communication-type navigation system.

A re-search function will be described with reference to FIGS. 39 and 40. Suppose that the present place of the user is at a position 3602 on an original route 3601. In this case, if so-called dynamic route search is available at the center, re-search from the present place can be performed there to calculate a new route 3603.

If the terminal 101 has no positioning function, the present place is based on a self-return system. As shown in FIG. 40, a re-search button is provided on each guidance screen, which makes possible re-search from that point as the starting point.

Figure 41:
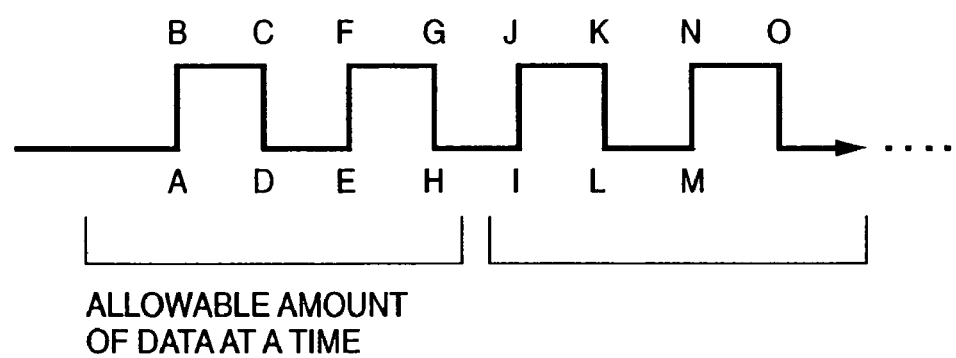
FIG. 41 is a diagram showing a specific example of a long-distance route according to the thirteenth embodiment of present invention.
Figure 42:
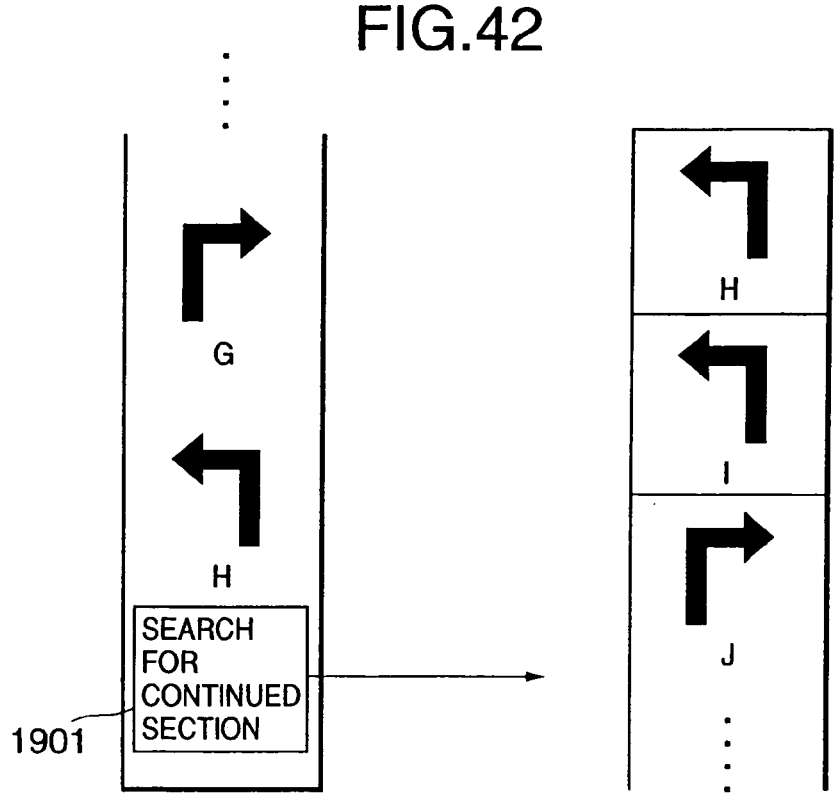
FIG. 42 is a diagram showing a specific example of a long-distance route re-search screen according to the thirteenth embodiment of present invention.
Figure 43:
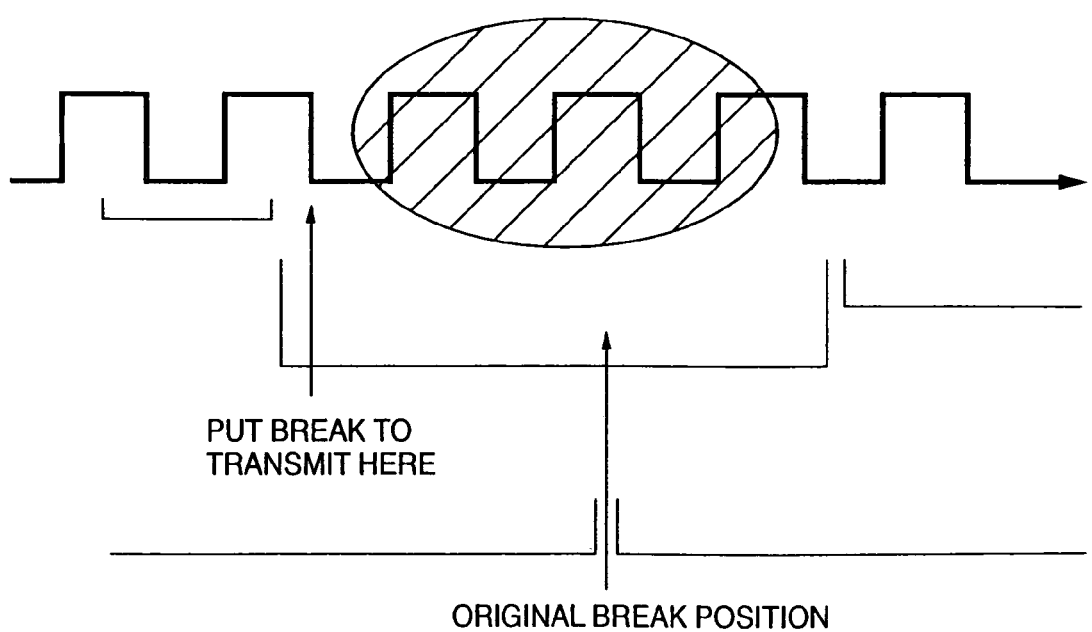
FIG. 43 is a diagram showing a specific example of re-search for avoiding an incommunicable zone according to the thirteenth embodiment of present invention.

As an application, the re-search function is applied to a long-distance route. As shown in FIG. 41, if the route is a long route on which there are many guide points, guidance is displayed halfway (guide points A to H), and a re-search button 1901 is provided at the end of the guidance display. When the user presses the button, the following guide points H to O are displayed. In this case, if a non-communicable zone is known beforehand as shown in FIG. 43, since re-search is impossible in this zone, it will be desirable to move forth re-search timing so that re-search will not occur in the non-communicable zone.

FOURTEENTH EMBODIMENT

When guidance dependent on the intersection or road names is performed, an error in the guidance tends to occur relatively at a nameless intersection or on a nameless road. To avoid this, the cost accompanied by right and left turns may be set more heavily for route search. Further, the turn cost at a nameless intersection can be weighted (where the turn cost is a parameter indicative of the degree of difficulty of a turn, and since a heavier (larger) degree means a more difficult turn, the turn cost is to reduce the guidance of intersections with heavy turn costs as less as possible) to avoid misleading guidance.

Figure 44:
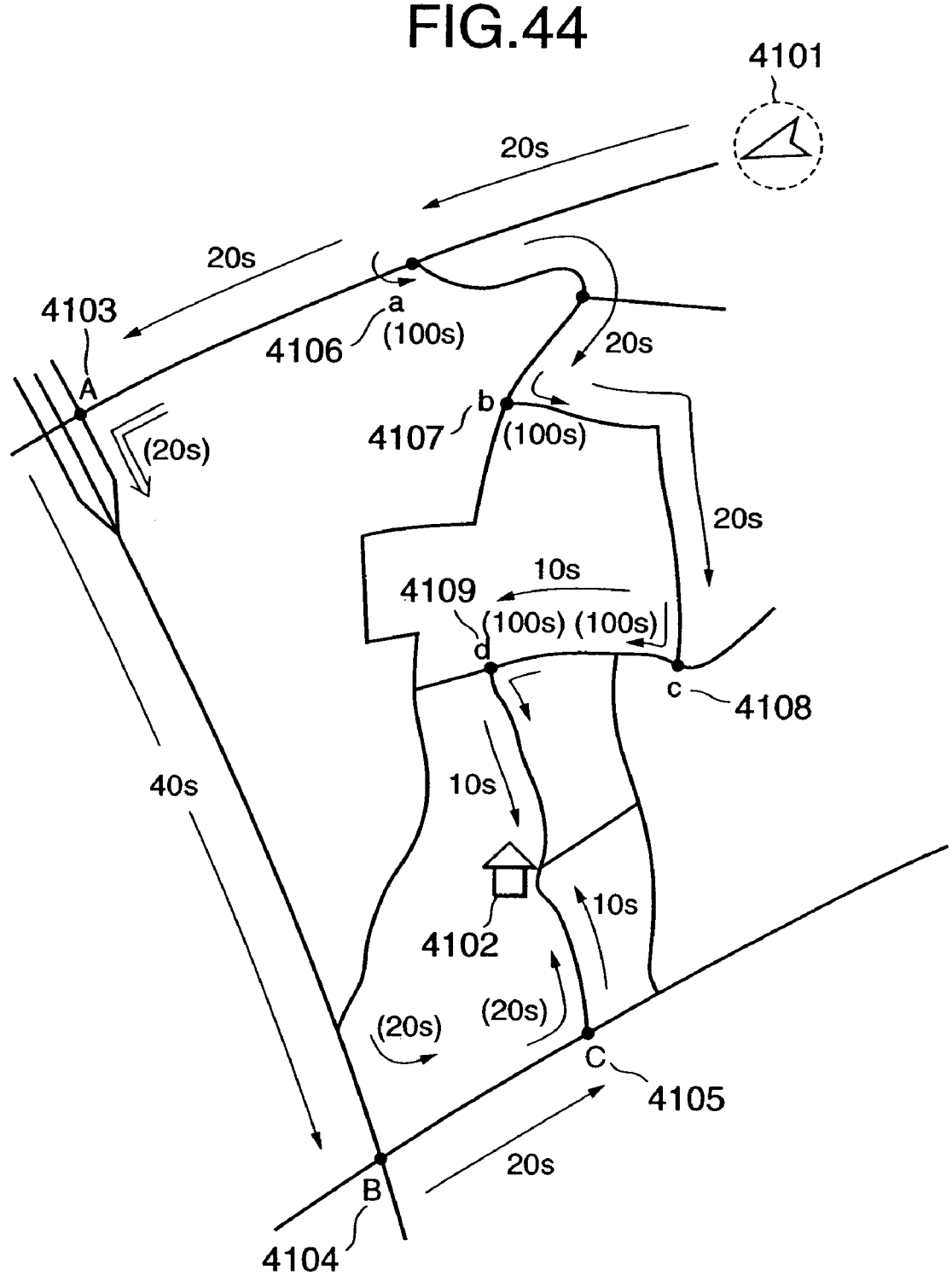
FIG. 44 is a map showing a virtual area according to the fourteenth embodiment of the present invention.

This situation is shown in FIG. 44. FIG. 44 is a map of an imaginary area, showing necessary time period of each road and a cost accompanied by each turn. Suppose that the user drives from a user's car position 4101 toward a destination 4102.

Suppose further that intersections A 4103 to C 4105 have their names and intersections a 4106 to d 4109 are nameless. In this case, the shortest route is a route to pass through the intersections a to d, but such a route to pass through the nameless intersections is not favorable. Another route to pass through the intersections A to C, though a detour, is a more easy-to-understand route.

Figure 45:
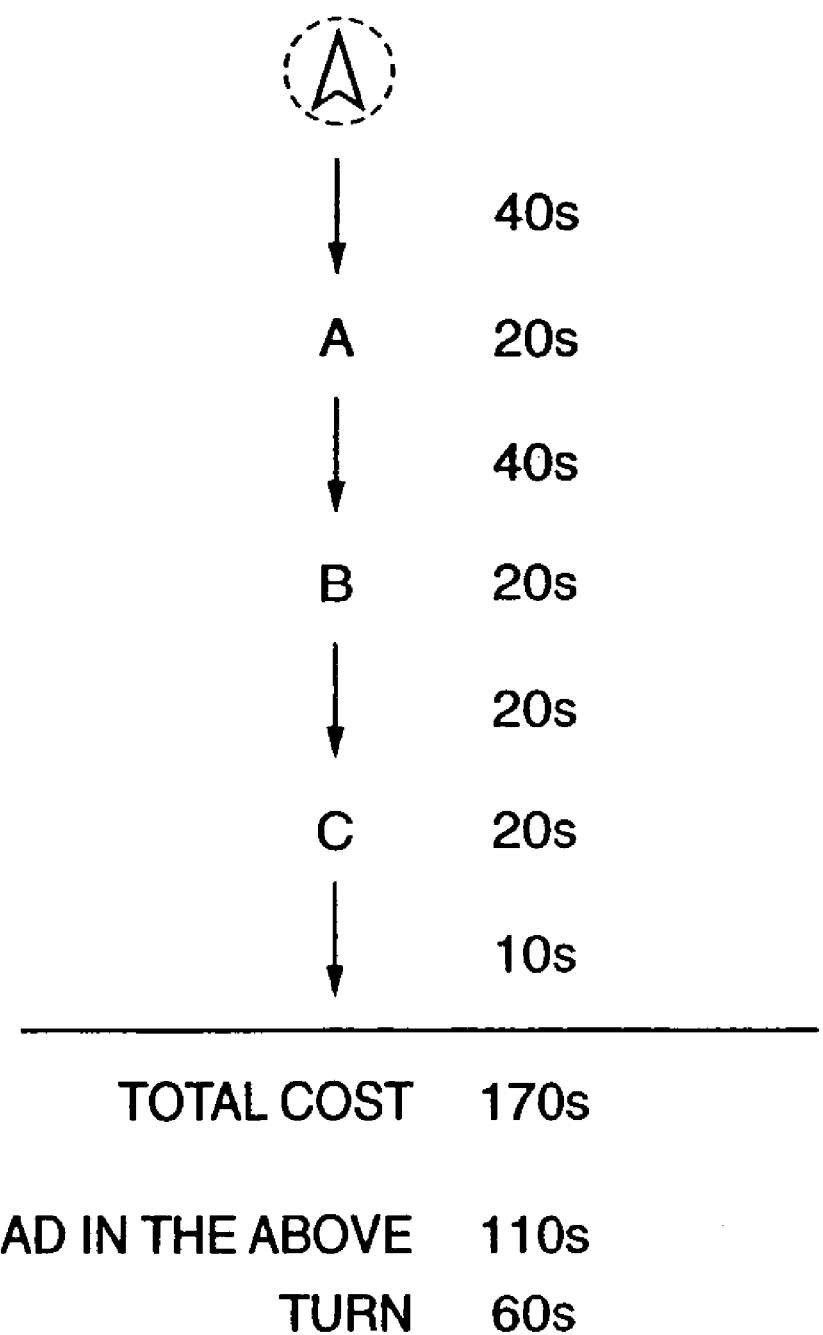
FIG. 45 is a diagram showing a specific example of a table of an easy-to-understand route according to the fourteenth embodiment of the present invention.
Figure 46:
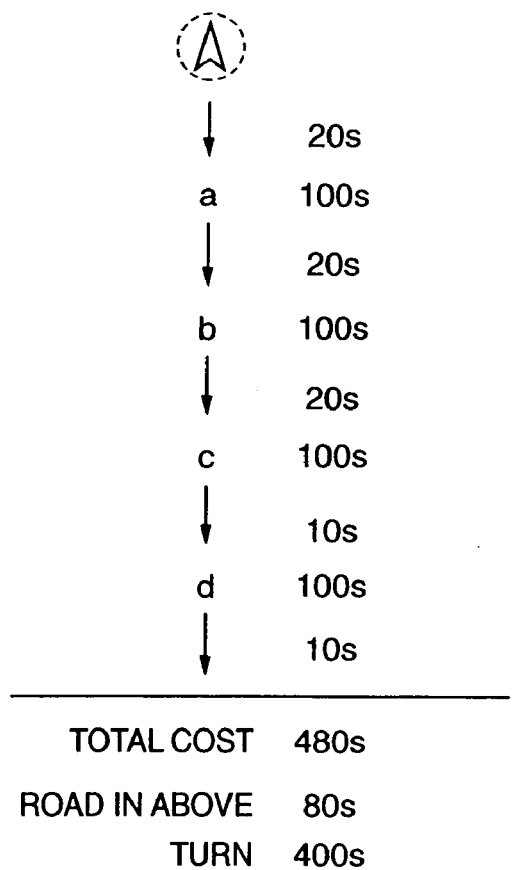
FIG. 46 is a diagram showing a specific example of a table of a difficult-to-understand route according to the fourteenth embodiment of the present invention.

FIG. 45 shows results of cost calculation for the devious, easy-to-understand route (route 1), and FIG. 46 shows results of cost calculation for the short-distance, difficult-to-understand route (route 2). Here, the turn cost of the named intersections A to C is set to 20 s each, and the turn cost of the nameless intersections a to d is set to 100 s each. For the route 1, the total distance cost is 170 s and the total turn cost is 60 s. For the route 2, the total distance cost is 80 s and the total turn cost is 400 s. A comparison between both total costs shows that the route 1 is to be selected.

Figure 47:
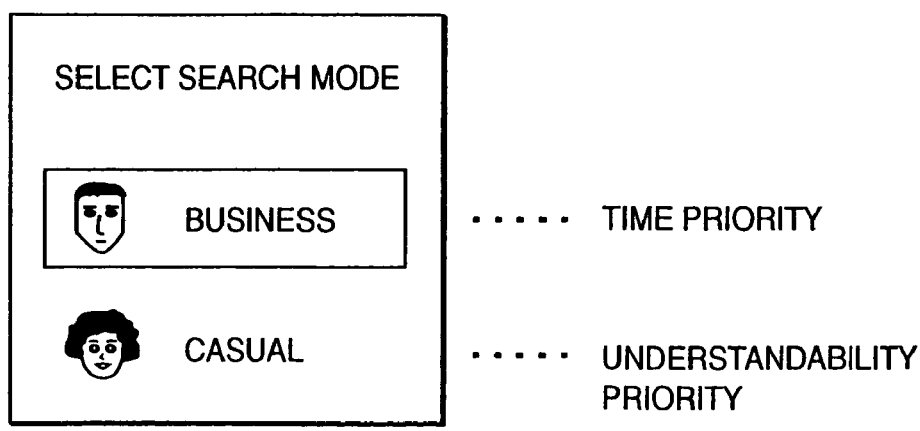
FIG. 47 is a diagram showing a specific example of a search mode selection screen according to the fourteenth embodiment of the present invention.

As shown in FIG. 47, it is desired that preferences to search be selectable according to the user model. For example, priority is assigned to time for business use, that is, all the turn costs are made uniform. On the other hand, priority is assigned to understandability for daily use. In this case, weights put on the turn costs are changed according to the mode selected, such as to put a weight on the turn cost of nameless intersections, thereby characterizing a calculated route.

As stated above, there can be provided a communication-type navigation system which searches for an easy-to-understand route to avoid making right and left turns at nameless, difficult-to-guide intersections.

FIFTEENTH EMBODIMENT

If the communication terminal 101 has a function of downloading and executing a program in addition to the data display and input/output functions, for example, if it is a JAVA applet-ready terminal, the following contrivance is possible.

Figure 48:
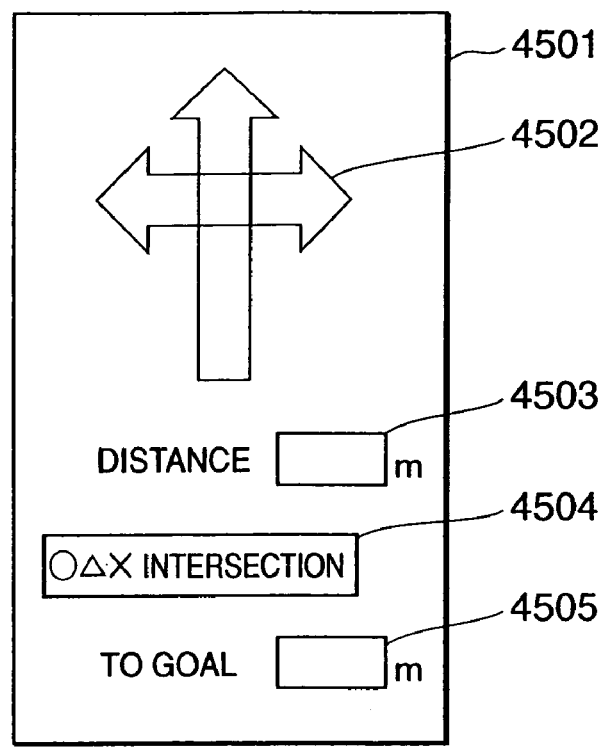
FIG. 48 is a diagram showing a specific example of a display of an applet according to the fifteenth embodiment of the present invention.

FIG. 48 shows an applet 4501 for displaying intersection guidance diagrams. The applet can show an arrow 4502, a distance display 4503 indicative of distance to an intersection, an intersection name display 4504 and a goal display 4504 indicative of distance to a destination. The applet 4501 is mounted as a kind of program and once downloaded to the terminal 101 through communication means. After that, the applet stays executable on the terminal 101 until it is abandoned.

Figure 49:
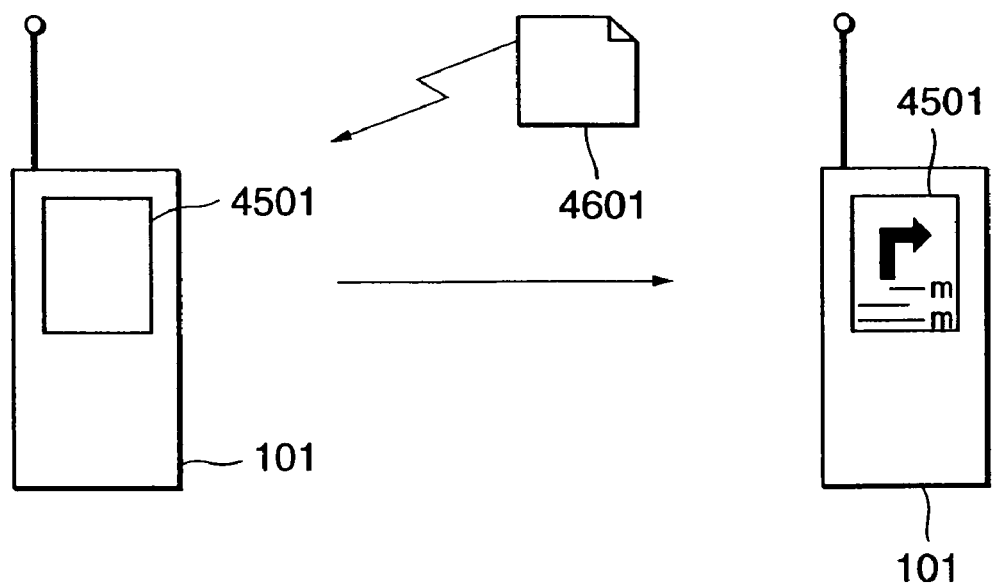
FIG. 49 is a diagram for explaining the operation of the applet according to the fifteenth embodiment of the present invention.
Figure 50:
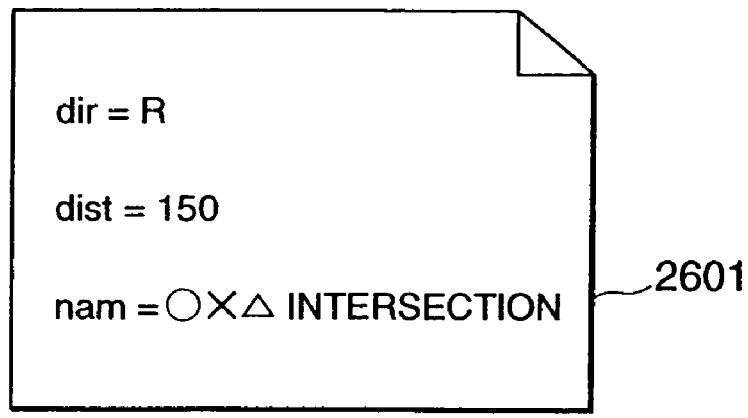
FIG. 50 is a diagram showing a specific example of a guidance display according to the fifteenth embodiment of the present invention.

The operation will be described with reference to FIGS. 49 and 50. The applet 4501 has already been downloaded in the terminal 101 shown in FIG. 49. When receiving a guidance message 4601, the applet program operates to display a proper arrow. FIG. 50 shows an example of the guidance message. The guidance message briefly describes information necessary to construct a guidance screen.

The above-mentioned operation enables a guidance screen to be constructed on the terminal 101 merely through communication of a brief guidance message without transmission of a guidance screen image for each intersection, which makes it possible to reduce traffic flows. Further, since the conception of page and file breaks is not required, seamless jumping becomes possible to any intersection guidance image screen before and after the screen currently displayed.

SIXTEENTH EMBODIMENT

Figure 51:
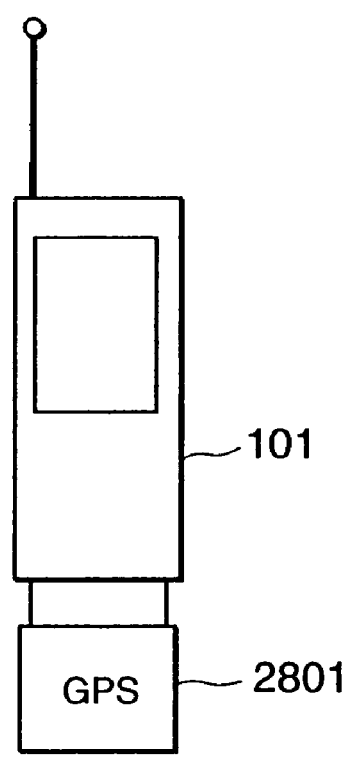
FIG. 51 is a diagram showing a configuration of a communication terminal according to the sixteenth embodiment of the present invention.

As shown in FIG. 51, a configuration which provides the terminal 101 with positioning means 2801 such as a GPS receiver is considered. Such a configuration enables a grasp of a real-time location, which makes it possible to navigate a car in consideration of its actual position.

Figure 52:
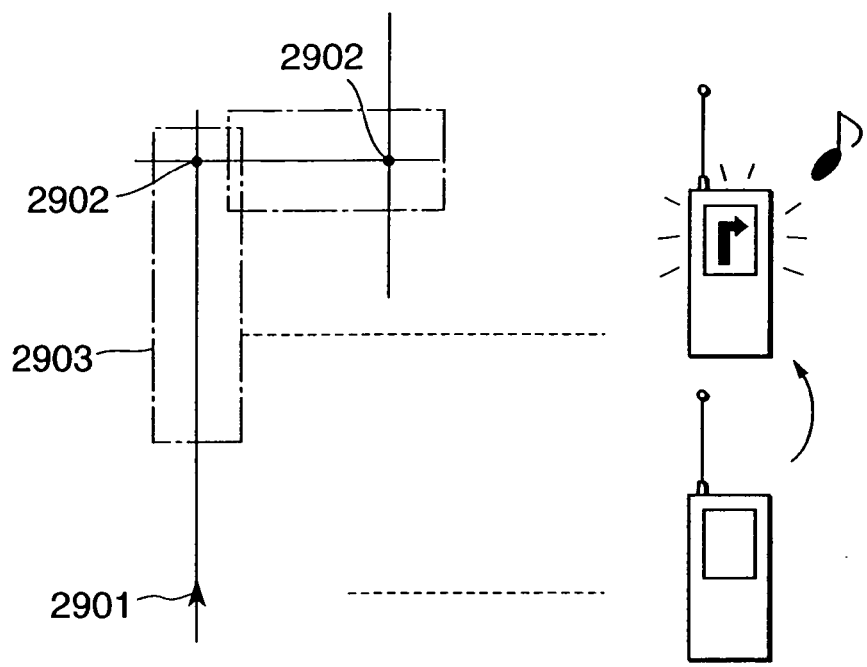
FIG. 52 is a diagram showing a specific example of a guidance zone according to the sixteenth embodiment of the present invention.

FIG. 52 shows route information sent from the center to the terminal 101. Shown in FIG. 52 are data with space coordinates of an actual route, rather than a mere screen of an enlarged view of intersections. It is assumed that the car moves from a car position 2901 to an intersection 2902 to be guided. In this case, a guide zone 2903 is set upstream from the guide point 2902.

When the terminal 101 enters the guide zone 2903, its backlight is automatically turned on or a tone is automatically rung, which makes it possible to instruct guidance to the driver for the time necessary. In addition, it can minimize battery drain.

The voice may be a predefined melody, voice data or voice data downloaded from the center. It may also be voice data for reading the intersection name.

Figure 54:
FIG. 54 is a diagram showing another specific example of route information according to the sixteenth embodiment of the present invention.

Although the route information for all the steps on the route may be sent as shown in FIG. 54, a method of sending route information that focuses only on the vicinity of the guide points without sending data on unnecessary sections on the way (sections in which the car just go along the road, and straight sections of the road) is also considerable to reduce the amount of communication.

Further, another method of sending route information with even surrounding roads added thereto can be devised, so that, in the event the car has gone off course, the off-course can be easily detected.

Figure 53:
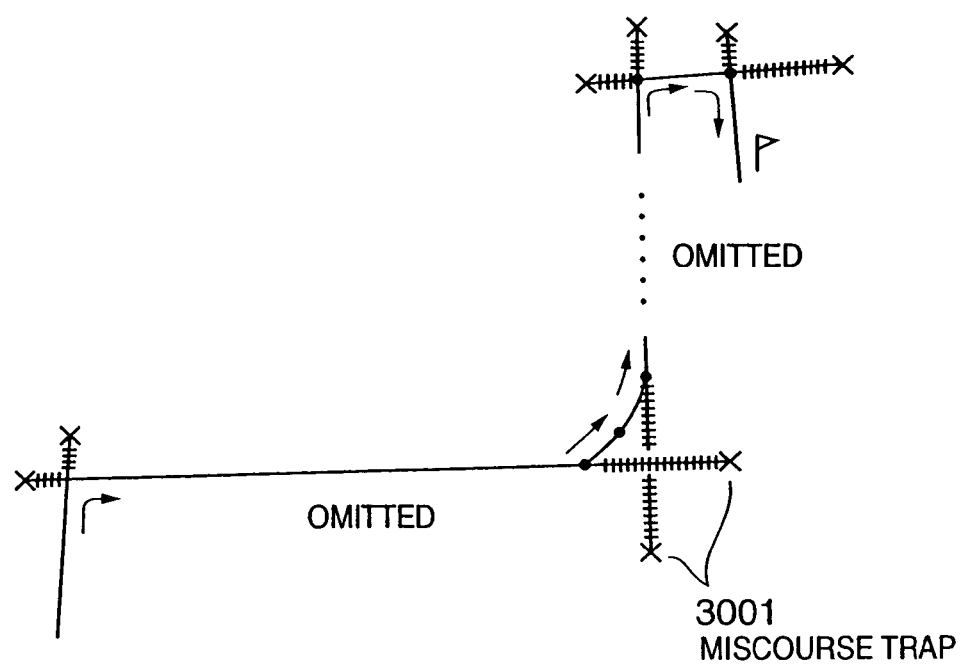
FIG. 53 is a diagram showing a specific example of route information according to the sixteenth embodiment of the present invention.

Miscourse traps 3001 shown in FIG. 53 are sent as road information representing roads to travel when the car goes off course. When the terminal side runs on an incorrect road, map matching with the miscourse trap is performed, thereby easily detecting the off-course. If there is no miscourse trap, it is more difficult to determine whether a positioning error occurs or the car has gone off course. In contrast, this method allows the terminal to detect off-course on the spot and hence urge the driver to take a course of action toward recovery.

In response to the detection of off-course, automatic search for a way to the original route or a new route to reach the destination is also possible.

Figure 39:
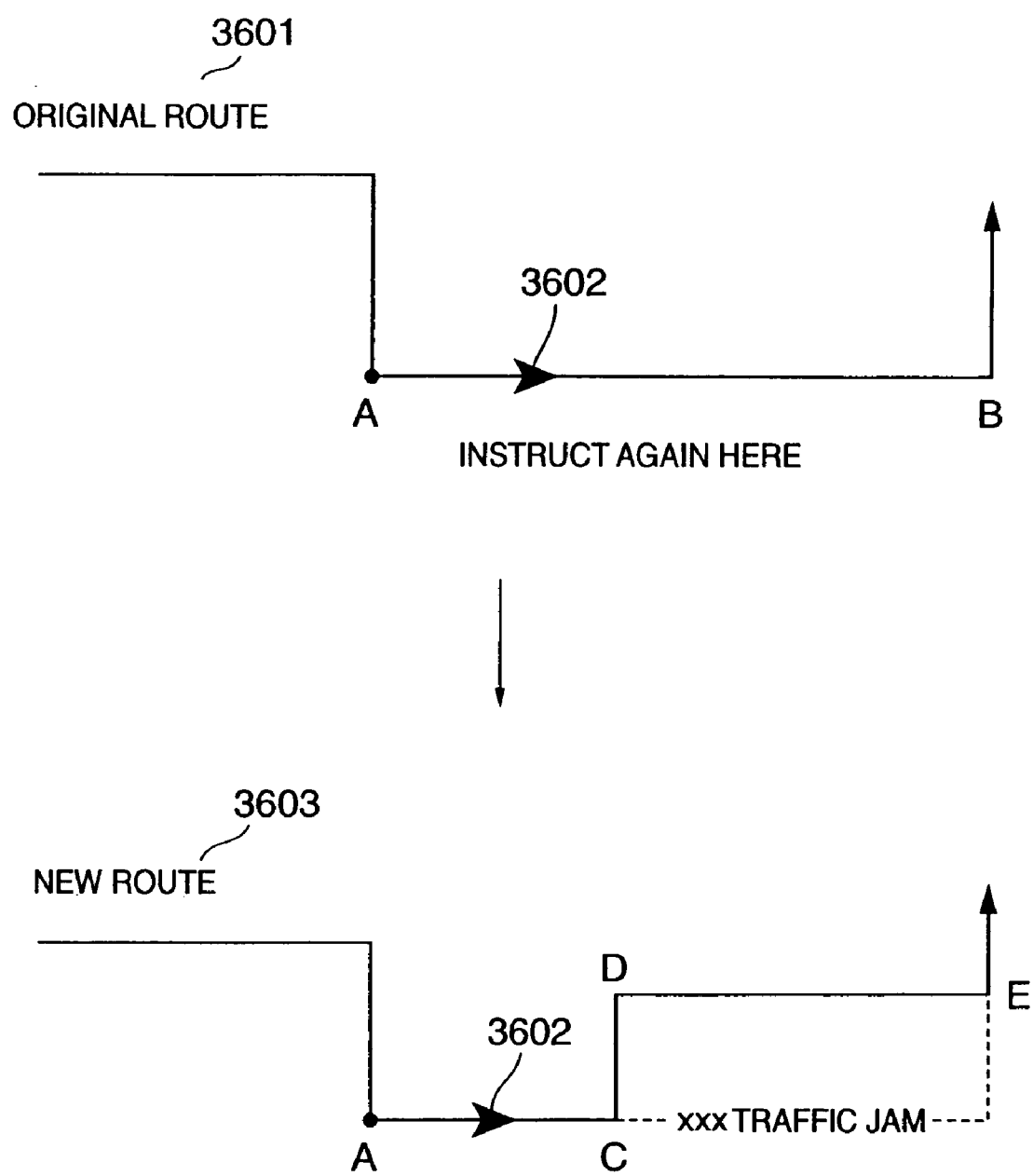
FIG. 39 is a diagram showing a specific example of a searched route according to the thirteenth embodiment of present invention.
Figure 40:
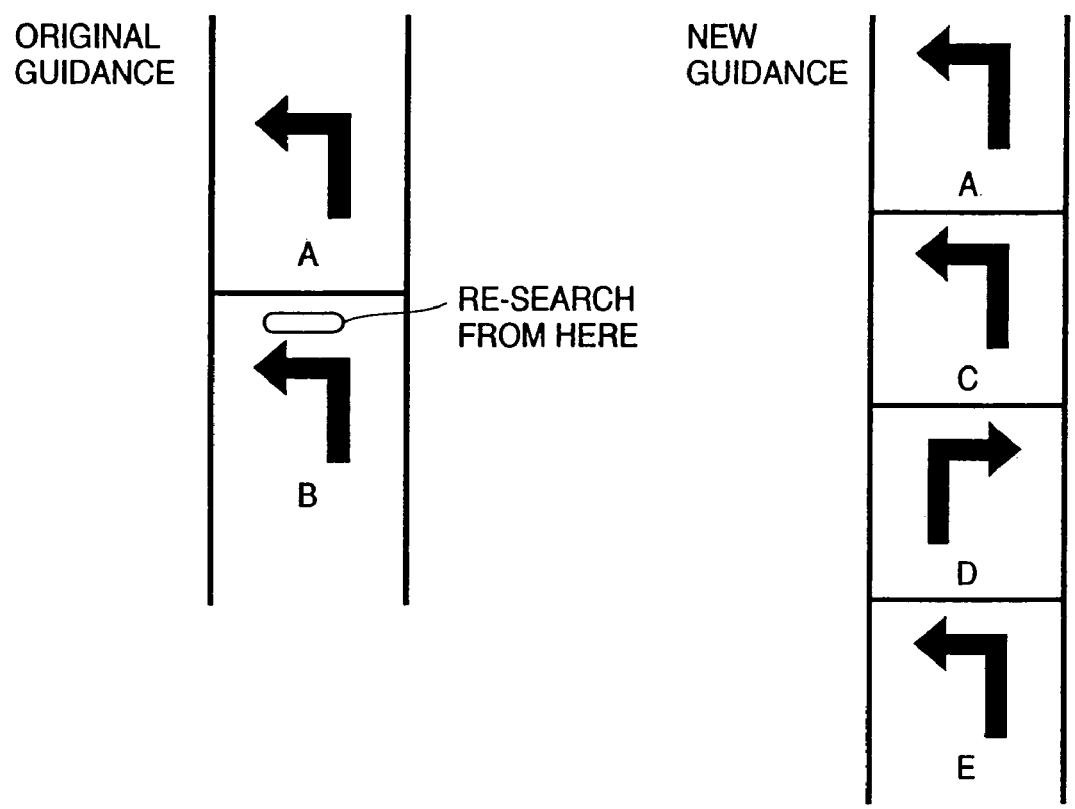
FIG. 40 is a diagram showing a specific example of route guidance according to the thirteenth embodiment of present invention.

Further, as shown in FIG. 39, an automatic route re-search when a traffic jam has occurred on the original route is considerable. Suppose that the terminal does not perform monitoring. In this case, a route searched at the center for each terminal can be stored in a fixed period of time so that when an event such as a traffic jam or accident has occurred on the route, the center will send a warning mail to the terminal 101 concerned, search for a new route and urge to the user to switch the current route to the new route.

Thus the user can get a notice from the center without the need to worry about occurrence of a traffic jam on the route. Further, a method of temporarily store, on a link basis, terminals or users which the center has guided to links as part of routes can be devised so that when an event has occurred on a link, the center can easily inform the terminal concerned of the event, which makes possible a quick notice.

Figure 56:
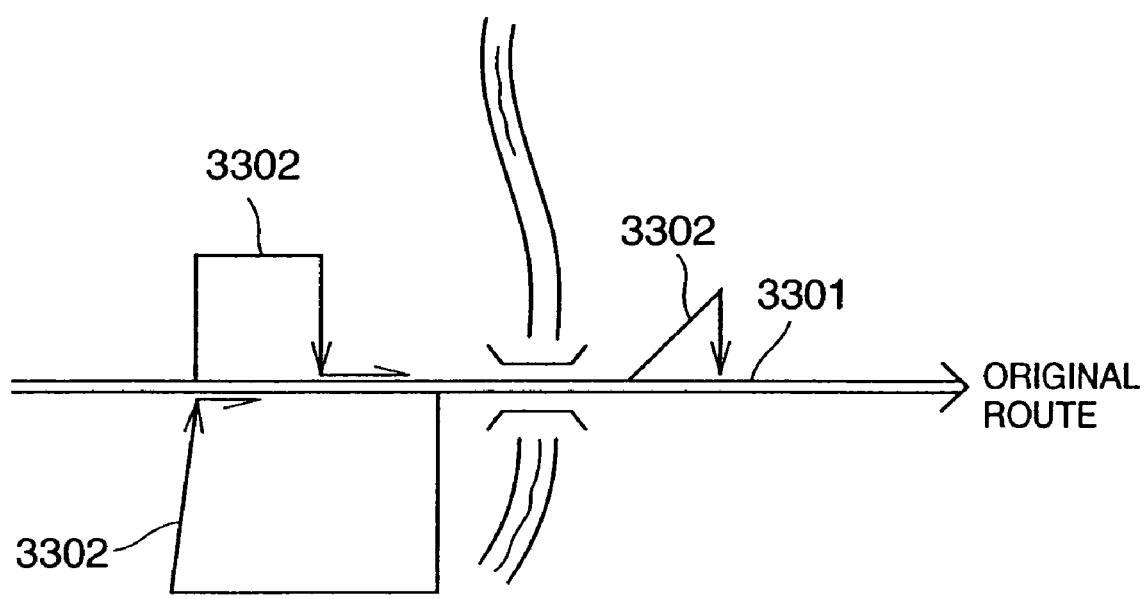
FIG. 56 is a diagram showing a specific example of a return route according to the sixteenth embodiment of the present invention.

Further, as shown in FIG. 56, a method of anticipating off-course from the original route to pre-calculate routes to return to the original route is considerable. In this case, the pre-calculated routes are sent together with the original route. In FIG. 56, when a car has deviated from an original route 3301, the driver returns to the original route 3301 via a return route 3302. If the car position deviates from the original route, since the car gets on the return route 3302, the driver can return to the original route through continued guidance of the return route. In this case, the operation is not re-search, and the driver does not need to communicate with the center.

SEVENTEENTH EMBODIMENT

Figure 55:
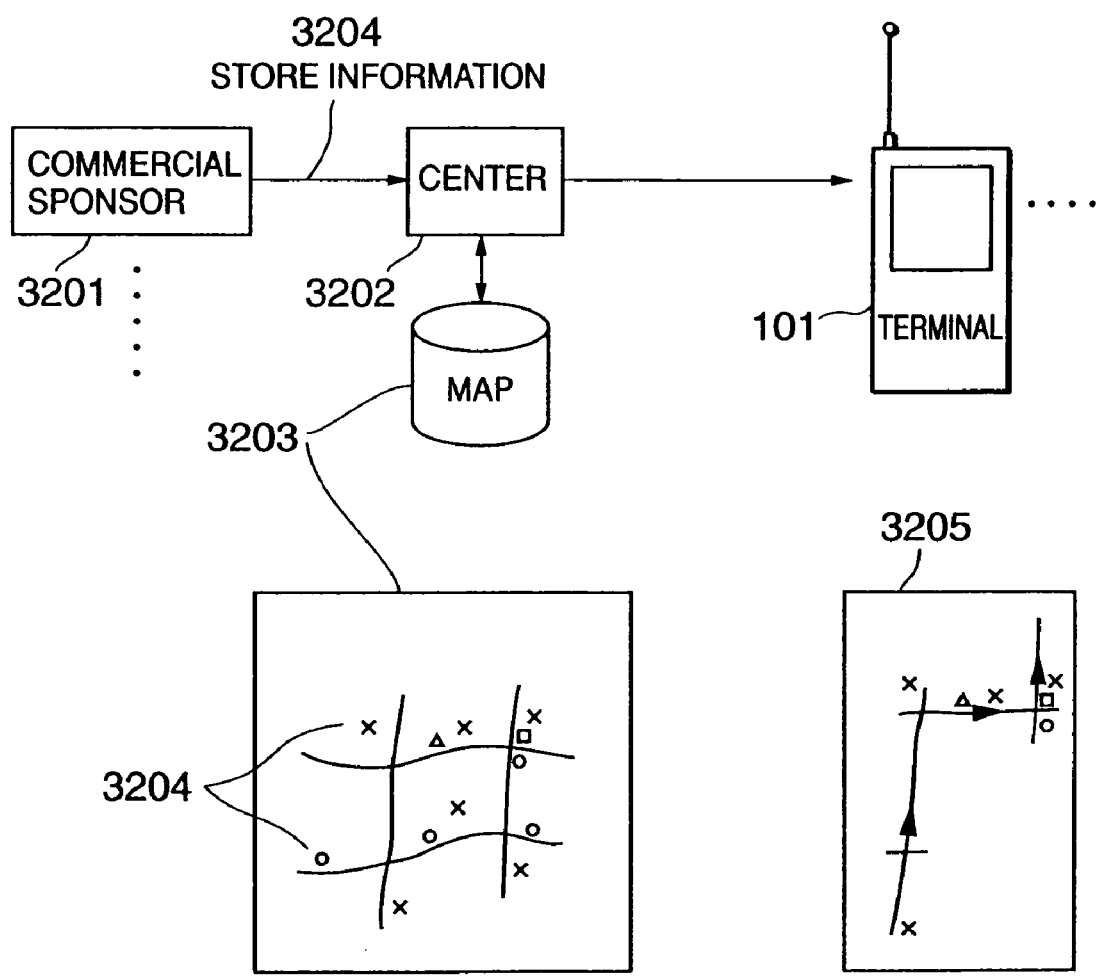
FIG. 55 is a diagram showing a configuration of a system according to the seventeenth embodiment of the present invention.

FIG. 55 shows an embodiment of an information-gathering system at the center. Each of commercial sponsors 3201 provides store information 3204 composed of various pieces of information such as a store name, a telephone number, a logotype and location information. The center 3202 stores these information on a map 3203.

When providing route information to the terminal 101, the center can send store information superimposed on the route information, thus obtaining route information 3205. The store information thus displayed or conducted on the terminal 101 can be effective media of store advertising, which makes it possible for the center to charge the commercial sponsors for the advertisement fees. Further, the center can count the number of times the store information is displayed or conducted on a store basis to charge each commercial sponsor for the advertisement fee according to the counted number.

INDUSTRIAL APPLICABILITY

As described above, the center transmits route information divided into pieces of information each of which has a size equal to or less than the reception capacity of the communication terminal, which can obtain such an effect that a communication-type navigation system for showing an initial geographical orientation or route can be realized on a communication terminal having a small display screen and a low capacity. Further, according to the present invention, a screen layout or hyperlink can be contrived to provide an outstanding route guidance information generating device and method capable of interpreting the contents of a display in a quick response time, and a storage medium on which the route guidance information is stored even in a case where the terminal has a hardware configuration with a small display screen and underperforming CPU and memory which can only perform simple control processing.

The invention claimed is:

1. A route guidance information generating device comprising: a display; a map store for storing a road network; an input unit for entering plural points; a search unit for taking in from said input unit information obtained from said map store to calculate a route between plural points; a route guidance element generating unit for generating route guidance elements for route guidance on the basis of the route result calculated by said search unit; and a route guidance information generating unit for generating route guidance information on the basis of the route guidance elements generated by said route guidance element generating unit, wherein said route guidance information generating unit generates route guidance information at plural guide points on the route between plural points as plural pieces of ordered information or information capable of fitting in one-screen display space of said display, wherein display positions of intersection names at the guide points in the route guidance information, composed of a plurality of names of intersections to pass through on the route between plural points, are brought into one-to-one correspondence with numeric key in ascending numeric order through hyperlinks.

2. The route guidance information generating device according to claim 1, wherein the route guidance information contains at least distance on each road to the next guide point.

3. The route guidance information generating device according to claim 1, wherein the route guidance information contains at least intersection names.

4. The route guidance information generating device according to claim 1, wherein the plural guide points include named intersections located at the nearest side of corresponding nameless intersections along the traveling direction as well as locations at which geographical orientations change to a considerable extent before and after intersections, Y branches and locations at which road types change.

5. The route guidance information generating device according to claim 1, wherein the route guidance information contains at least display information images, which represent with arrows traveling directions at intersections of roads.

6. The route guidance information generating device according to claim 1, wherein the route guidance information contains at least display information images, which represent with arrows directions indicative of crossing conditions at intersections of roads and traveling directions at the intersections of roads.

7. The route guidance information generating device according to claim 1, wherein the route guidance information contains at least display information images, which represent with arrows directions indicative of crossing conditions at intersections of roads, widths of the roads and traveling directions at the intersections of the roads.

8. The route guidance information generating device according to claim 1, wherein the route guidance information contains at least display information images which represent with arrows traveling directions at intersections of roads, and distance on each road to the next guide point, the distance being located at the tip of each arrow of the display information images that represent with the arrows the traveling directions.

9. The route guidance information generating device according to claim 1, wherein the route guidance information contains at least display information images which represent break lines between the guide points.

10. The route guidance information generating device according to claim 1, wherein the route guidance information contains at least any of character, image or voice information, or a combination of these pieces of information.

11. The route guidance information generating device according to claim 1, wherein a route guidance simplified map is represented by images, the map schematically synthesizing driving directions of the intersections at the plural guide points in one file, brought into one-to-one correspondence with the numeric keys, corresponding numerals are put in positions corresponding to the guide points on the route guidance simplified map, and the display positions are brought into one-to-one correspondence with the numeric keys in ascending numeric order, and into correspondence with one another thorough hyperlinks.

12. The route guidance information generating device according to claim 1, wherein the positions at which corresponding numerals are represented on the route guidance simplified map are standardized on either the right or left side of the traveling directions.

13. The route guidance information generating device according to claim 1, wherein information is created for representing the route guidance information in plural levels of hierarchy and associating the plural levels of the guidance information with one another through a hyperlink on a guide point basis.

14. The route guidance information generating device according to claim 13, wherein the route guidance information represented in the plural levels of hierarchy is divided into files dependently on the division of the next-higher level of hierarchy.

15. A route guidance information generating device comprising:

a display;

a map store for storing a road network;

an input unit for entering plural points;

a search unit for taking in from said input unit information obtained from said map store to calculate a route between plural points;

a route guidance element generating unit for generating route guidance elements for route guidance on the basis of the route result calculated by said search unit; and a route guidance information generating unit for generating route guidance information on the basis of the route guidance elements generated by said route guidance element generating unit;

wherein said route guidance information generating unit generates route guidance information of plural guide points on the route as respective pieces of ordered information, representative of a plurality of names of intersections to pass through on the route between plural points, adapted to be displayed as a one-screen simplified display on said display, said pieces of information represented by corresponding numeric keys on the one-screen simplified display in a one-to-one correspondence through hyperlinks to respective other displays each adaptable to be displayed on the display when the numeric key corresponding to the each display is activated on the one-screen simplified display without the need to obtain further pieces of information from said route guidance information generating unit or said map store.

* * * * *